US012354537B2

(12) United States Patent
Han et al.

(10) Patent No.: US 12,354,537 B2
(45) Date of Patent: Jul. 8, 2025

(54) DISPLAY DEVICE AND CONTROL METHOD THEREFOR

(71) Applicant: SAMSUNG ELECTRONICS CO., LTD., Suwon-si (KR)

(72) Inventors: Seungryong Han, Suwon-si (KR); Tetsuya Shigeta, Suwon-si (KR); Gangmo Koo, Suwon-si (KR); Hwaseok Seong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/752,432

(22) Filed: Jun. 24, 2024

(65) Prior Publication Data

US 2024/0346990 A1 Oct. 17, 2024

Related U.S. Application Data

(63) Continuation of application No. PCT/KR2023/002146, filed on Feb. 14, 2023.

(30) Foreign Application Priority Data

Feb. 24, 2022 (KR) ........................ 10-2022-0024654
Apr. 12, 2022 (KR) ........................ 10-2022-0045392

(51) Int. Cl.
*G09G 3/32* (2016.01)

(52) U.S. Cl.
CPC ....... *G09G 3/32* (2013.01); *G09G 2300/0842* (2013.01); *G09G 2320/0209* (2013.01); *G09G 2320/0276* (2013.01)

(58) Field of Classification Search
CPC ... G09G 3/32–3291; G09G 2300/0842; G09G 2310/0243; G09G 2310/06;
(Continued)

(56) References Cited

U.S. PATENT DOCUMENTS 7,773,049 B2 8/2010 Ueno et al.
8,619,163 B2 12/2013 Ogura et al.
(Continued)

FOREIGN PATENT DOCUMENTS

CN 109447988 A * 3/2019 ........... G06T 7/0004
JP 3792246 B2 7/2006
(Continued)

OTHER PUBLICATIONS

English translation of CN 109447988 (Year: 2019).*
(Continued)

*Primary Examiner* — Nathan Danielsen
(74) *Attorney, Agent, or Firm* — Sughrue Mion, PLLC

(57) ABSTRACT

A display device including: a display including a plurality of pixels in a plurality of pixel lines; a memory for storing a first cross-talk and a second cross-talk weight; and at least one processor configured to: simultaneously apply an image signal to the plurality of pixel lines; acquire a plurality of grayscale values and a plurality of grayscale sections of each of the plurality of pixels; acquire, based on the plurality of grayscale values, first histogram and second histogram
(Continued)

information; identify a first cross-talk amount based on the first histogram information and the first cross-talk weight; identify a second cross-talk amount based on the second histogram information and the second cross-talk weight; acquire grayscale correction data of the target pixel based on the first cross-talk amount and the second cross-talk amount; and acquire a corrected grayscale value of the target pixel based on the grayscale correction data.

20 Claims, 18 Drawing Sheets

(58) Field of Classification Search
CPC ....... G09G 2310/08; G09G 2320/0209; G09G 2320/0219; G09G 2320/0233; G09G 2320/0242; G09G 2320/0271; G09G 2320/0276; G09G 2320/029; G09G 2320/0295; G09G 2320/04; G09G 2320/048; G09G 2320/0686; G09G 2320/0693
See application file for complete search history.

(56) References Cited

U.S. PATENT DOCUMENTS

| | | | |
|---|---|---|---|
| 9,251,744 B2 | 2/2016 | Bae et al. | |
| 10,482,839 B2 | 11/2019 | Pyun | |
| 10,993,431 B2 | 5/2021 | Fujii et al. | |
| 11,004,400 B2 | 5/2021 | Yoon et al. | |
| 11,295,678 B2 | 4/2022 | Zheng et al. | |
| 2011/0122160 A1* | 5/2011 | Chou | G09G 5/02 345/690 |

FOREIGN PATENT DOCUMENTS

| | | | | |
|---|---|---|---|---|
| JP | 5367182 B2 | | 12/2013 | |
| JP | 2021-63854 A | | 4/2021 | |
| KR | 2007056978 A | * | 6/2007 | G09G 3/3614 |
| KR | 10-0856161 B1 | | 9/2008 | |
| KR | 10-1382058 B1 | | 4/2014 | |
| KR | 10-2062049 B1 | | 1/2020 | |
| KR | 10-2117587 B1 | | 6/2020 | |
| KR | 10-2171259 B1 | | 10/2020 | |
| KR | 10-2020-0133129 A | | 11/2020 | |
| KR | 10-2021-0057892 A | | 5/2021 | |
| KR | 10-2021-0097203 A | | 8/2021 | |
| KR | 10-2348701 B1 | | 1/2022 | |

OTHER PUBLICATIONS

English translation of KR 20070056978 (Year: 2007).*
International Search Report (PCT/ISA/210) issued May 22, 2023 by the International Searching Authority in International Patent application No. PCT/KR2023/002146.
Written Opinion(PCT/ISA/237) issued May 22, 2023 by the International Searching Authority in International Patent application No. PCT/KR2023/002146.

* cited by examiner

FIG. 3A

310

311

312

| P1 AND P2 BELONGING TO DIFFERENT PIXEL LINES | | GRAYSCALE OF P1 (SOURCE) | | | | |
|---|---|---|---|---|---|---|
| | | 0 | 51 | 102 | 153 | 204 |
| GRAYSCALE OF P2 (TARGET) | 0 | 0 | 0 | 0 | 0 | 0 |
| | 51 | -400 | 0 | +100 | +200 | +250 |
| | 102 | -150 | -100 | 0 | +100 | +150 |
| | 153 | -60 | 0 | 0 | 0 | +50 |
| | 204 | -40 | 0 | 0 | -150 | 0 |

FIG. 3B

320

321

322

| P1 AND P2 BELONGING TO SAME PIXEL LINE | | GRAYSCALE OF P1 (SOURCE) | | | | |
|---|---|---|---|---|---|---|
| | | 0 | 51 | 102 | 153 | 204 |
| GRAYSCALE OF P2 (TARGET) | 0 | 0 | 0 | 0 | 0 | 0 |
| | 51 | -800 | 0 | +200 | +400 | +500 |
| | 102 | -300 | -200 | 0 | +200 | +300 |
| | 153 | -120 | 0 | 0 | 0 | +100 |
| | 204 | -80 | 0 | 0 | -300 | 0 |

FIG. 4A

410

411

412

| P1 AND P2 BELONGING TO DIFFERENT PIXEL LINES | | GRAYSCALE R OF P1 (SOURCE) | | | | |
|---|---|---|---|---|---|---|
| | | 0 | 51 | 102 | 153 | 204 |
| GRAYSCALE R OF P2 (TARGET) | 0 | 0 | 0 | 0 | 0 | 0 |
| | 51 | -300 | 0 | +80 | +150 | +200 |
| | 102 | -100 | -70 | 0 | +60 | +90 |
| | 153 | -40 | 0 | 0 | 0 | +30 |
| | 204 | -30 | 0 | 0 | -80 | 0 |

FIG. 4B

420

421

422

| P1 AND P2 BELONGING TO DIFFERENT PIXEL LINES | | GRAYSCALE G OF P1 (SOURCE) | | | | |
|---|---|---|---|---|---|---|
| | | 0 | 51 | 102 | 153 | 204 |
| GRAYSCALE G OF P2 (TARGET) | 0 | 0 | 0 | 0 | 0 | 0 |
| | 51 | -250 | 0 | +70 | +140 | +180 |
| | 102 | -90 | -50 | 0 | +70 | +100 |
| | 153 | -50 | 0 | 0 | 0 | +40 |
| | 204 | -20 | 0 | 0 | -110 | 0 |

FIG. 4C

430

431

432

| P1 AND P2 BELONGING TO DIFFERENT PIXEL LINES | | GRAYSCALE B OF P1 (SOURCE) | | | | |
|---|---|---|---|---|---|---|
| | | 0 | 51 | 102 | 153 | 204 |
| GRAYSCALE B OF P2 (TARGET) | 0 | 0 | 0 | 0 | 0 | 0 |
| | 51 | -270 | 0 | +70 | +160 | +210 |
| | 102 | -130 | -60 | 0 | +80 | +110 |
| | 153 | -50 | 0 | 0 | 0 | +30 |
| | 204 | -20 | 0 | 0 | -90 | 0 |

FIG. 5A 510 511 513 514 515 512

| P1 AND P2 BELONGING TO DIFFERENT PIXEL LINES | | GRAYSCALE OF P1 (SOURCE) | | | | | | |
|---|---|---|---|---|---|---|---|---|
| | | 0 | 17 | 34 | 51 | 102 | 153 | 204 |
| GRAYSCALE OF P2 (TARGET) | 0 | 0 | 0 | 0 | 0 | 0 | 0 | 0 |
| | 17 | -1000 | 0 | +300 | +200 | +150 | +200 | +300 |
| | 34 | -600 | -300 | 0 | +150 | +100 | +100 | +200 |
| | 51 | -400 | -150 | -100 | 0 | +100 | +200 | +250 |
| | 102 | -150 | -50 | -30 | -100 | 0 | +100 | +150 |
| | 153 | -60 | -20 | 0 | 0 | 0 | 0 | +50 |
| | 204 | -40 | -20 | -200 | 0 | 0 | -150 | 0 |

FIG. 5B

| P1 AND P2 BELONGING TO SAME PIXEL LINE | | GRAYSCALE OF P1 (SOURCE) | | | | | | |
|---|---|---|---|---|---|---|---|---|
| | | 0 | 17 | 34 | 51 | 102 | 153 | 204 |
| GRAYSCALE OF P2 (TARGET) | 0 | 0 | 0 | 0 | 0 | 0 | 0 | 0 |
| | 17 | -2000 | 0 | +600 | +400 | +300 | +400 | +600 |
| | 34 | -1200 | -600 | 0 | +300 | +200 | +200 | +400 |
| | 51 | -800 | -300 | -200 | 0 | +200 | +400 | +500 |
| | 102 | -300 | -100 | -60 | -200 | 0 | +200 | +300 |
| | 153 | -120 | -40 | 0 | 0 | 0 | 0 | +100 |
| | 204 | -80 | -40 | -400 | 0 | 0 | -300 | 0 |

DISPLAY DEVICE AND CONTROL METHOD THEREFOR

CROSS-REFERENCE TO RELATED APPLICATIONS

This application is a continuation of International Application No. PCT/KR2023/002146, filed on Feb. 14, 2023, which is based on and claims priority to Korean Patent Application No. 10-2022-0024654, filed on Feb. 24, 2022, in the Korean Intellectual Property Office and Korean Patent Application No. 10-2022-0045392, filed on Apr. 12, 2022, in the Korean Intellectual Property Office, the disclosures of which are incorporated by reference herein in their entireties.

BACKGROUND

1. Field

The present disclosure relates to a display device and a control method therefor, and more particularly, to a display device capable of reducing cross-talk and a control method for reducing cross-talk.

2. Description of the Related Art

In recent years, a display device displaying an image a through display panel has become generally popular and been used. The display device may include a plurality of thin film transistors (TFTs) on the display panel, and unintended electromagnetic coupling may occur between the plurality of TFTs in a design process of the display device.

The electromagnetic coupling that occurs between the plurality of TFTs may cause pixels included in the display panel to affect each other, thus resulting in a pixel operated at a higher or lower luminance than a luminance value desired by the display device, which is referred to as cross-talk (or X-talk).

If the cross-talk occurs, the image provided through the display panel may be deteriorated, which may cause a user receiving the image to have lower satisfaction. Accordingly, a method of reducing the cross-talk occurring on the display panel has been studied. In particular, there has been a continuous need for a method of reducing the cross-talk that may occur between pixels included in pixel lines simultaneously scanned on the display panel.

SUMMARY

Additional aspects will be set forth in part in the description which follows and, in part, will be apparent from the description, or may be learned by practice of the presented embodiments.

According to an aspect of the disclosure, provided is a display device which may acquire histogram information based on a grayscale value of each pixel included in a plurality of pixel lines, and estimate and compensate for a cross-talk amount of a target pixel by utilizing cross-talk weight information and histogram information for each grayscale corresponding to the pixels included in the same pixel line or different pixel lines, and a control method therefor.

According to an aspect of the disclosure, a display device includes: a display including a plurality of pixels in a plurality of pixel lines; a memory for storing a first cross-talk weight based on a pixel included in another pixel line scanned simultaneously with a pixel line to which a target pixel belongs, and a second cross-talk weight based on a pixel included in the pixel line to which the target pixel belongs; and at least one processor configured to: simultaneously apply an image signal to the plurality of pixel lines spaced apart from each other by a predetermined distance; acquire a plurality of grayscale values and a plurality of grayscale sections of each of the plurality of pixels included in the plurality of pixel lines; acquire, based on the plurality of grayscale values, first histogram information indicating a number of pixels included in the another pixel line scanned simultaneously with the pixel line to which the target pixel for each grayscale section belongs, and second histogram information indicating a number of pixels included in the pixel line to which the target pixel for each grayscale section belongs; identify a first cross-talk amount based on the first histogram information and the first cross-talk weight; identify a second cross-talk amount based on the second histogram information and the second cross-talk weight; acquire grayscale correction data of the target pixel based on the first cross-talk amount and the second cross-talk amount; and acquire a corrected grayscale value of the target pixel based on the grayscale correction data.

The first cross-talk weight and the second cross-talk weight may each include a cross-talk weight for each grayscale of a source pixel corresponding to a first grayscale value of the target pixel and a cross-talk weight for each grayscale of a source pixel corresponding to a second grayscale value of the target pixel.

The at least one processor may be further configured to acquire the first histogram information and the second histogram information by classifying an entire grayscale range into the plurality of grayscale sections and identifying the number of pixels corresponding to each of the plurality of grayscale sections based on each grayscale value of the acquired pixels.

The at least one processor may be further configured to acquire the first histogram information and the second histogram information by classifying a first grayscale range less than a critical value in the entire grayscale range as the plurality of grayscale sections of a first length and classifying a second grayscale range greater than the critical value as the plurality of grayscale sections of a second length greater than the first length.

The grayscale correction data of the target pixel may include a gain value for adjusting the grayscale value for each of the plurality of grayscale sections to which the target pixel belongs. The at least one processor may be further configured to identify, from the grayscale correction data of the target pixel, the grayscale section to which each grayscale value of the plurality of pixels included in the plurality of pixel lines belongs, and acquire the corrected grayscale value of the target pixel based on an interpolated gain value based on the gain value corresponding to the identified grayscale section and the gain value corresponding to the grayscale section adjacent to the identified grayscale section.

The first cross-talk weight and the second cross-talk weight each may include a cross-talk weight for each grayscale of at least one of a red (R), green (G), or blue (B) subpixel of a source pixel corresponding to an R grayscale value of the target pixel, a cross-talk weight for each grayscale of at least one of the R, G, or B subpixel of a source pixel corresponding to a G grayscale value of the target pixel, and a cross-talk weight for each grayscale of at least one of the R, G, or B subpixel of a source pixel corresponding to a B grayscale value of the target pixel.

Each of the plurality of pixels may include a light emitting diode (LED) pixel.

The at least one processor may be further configured to perform gamma conversion on the grayscale correction data and acquire the corrected grayscale value based on the gamma converted grayscale correction data.

According to another aspect of the disclosure, a method for controlling a display device for simultaneously applying an image signal to a plurality of pixels in a plurality of pixel lines spaced apart from each other by a predetermined distance includes: acquiring a plurality of grayscale values and a plurality of grayscale sections of each of the plurality of pixels included in the plurality of pixel lines spaced apart from each other by the predetermined distance; acquiring, based on the plurality of grayscale values, first histogram information indicating a number of pixels included in another pixel line scanned simultaneously with a pixel line to which a target pixel for each grayscale section belongs, and second histogram information indicating a number of pixels included in a pixel line to which the target pixel for each grayscale section belongs; identifying a first cross-talk amount based on the first histogram information and a first cross-talk weight based on the plurality of pixels included in the another pixel line scanned simultaneously with the pixel line to which the target pixel belongs; identifying a second cross-talk amount based on the second histogram information and a second cross-talk weight based on the plurality of pixels included in the pixel line to which the target pixel belongs; acquiring grayscale correction data of the target pixel based on the first cross-talk amount and the second cross-talk amount; and acquiring a corrected grayscale value of the target pixel based on the grayscale correction data.

The first cross-talk weight and the second cross-talk weight may each include a cross-talk weight for each grayscale of a source pixel corresponding to a first grayscale value of the target pixel and a cross-talk weight for each grayscale of a source pixel corresponding to a second grayscale value of the target pixel.

The first histogram information and the second histogram information may be acquired by classifying an entire grayscale range into the plurality of grayscale sections and identifying the number of pixels corresponding to each of the plurality of grayscale sections based on each grayscale value of the acquired pixels.

The first histogram information and the second histogram information may be further acquired by classifying a first grayscale range less than a critical value in the entire grayscale range as the plurality of grayscale sections of a first length and classifying a second grayscale range greater than the critical value as the plurality of grayscale sections of a second length greater than the first length.

The grayscale correction data of the target pixel may include a gain value for adjusting the grayscale value for each of the plurality of grayscale sections to which the target pixel belongs. The acquiring of the corrected grayscale value of the target pixel may include identifying, from the grayscale correction data of the target pixel, the grayscale section to which each grayscale value of the plurality of pixels included in the plurality of pixel lines belongs, and acquiring the corrected grayscale value of the target pixel based on an interpolated gain value based on the gain value corresponding to the identified grayscale section and the gain value corresponding to the grayscale section adjacent to the identified grayscale section.

The first cross-talk weight and the second cross-talk weight may each include a cross-talk weight for each grayscale of at least one of a red (R), green (G), or blue (B) subpixel of a source pixel corresponding to an R grayscale value of the target pixel, a cross-talk weight for each grayscale of at least one of the R, G, or B subpixel of a source pixel corresponding to a G grayscale value of the target pixel, and a cross-talk weight for each grayscale of at least one of the R, G, or B subpixel of a source pixel corresponding to a B grayscale value of the target pixel.

According to another aspect of the disclosure, a non-transitory computer-readable recording medium storing a computer instruction that causes a display device to perform an operation executed by at least one processor of the display device includes: acquiring a plurality of grayscale values and a plurality of grayscale sections of each of a plurality of pixels included in a plurality of pixel lines spaced apart from each other by a predetermined distance; acquiring, based on the plurality of grayscale values, first histogram information indicating a number of pixels included in another pixel line scanned simultaneously with a pixel line to which a target pixel for each grayscale section belongs and second histogram information indicating a number of pixels included in the pixel line to which the target pixel for each grayscale section belongs; identifying a first cross-talk amount based on the first histogram information and a first cross-talk weight based on the plurality of pixels included in the another pixel line scanned simultaneously with the pixel line to which the target pixel belongs; identifying a second cross-talk amount based on the second histogram information and a second cross-talk weight based on the plurality of pixels included in the pixel line to which the target pixel belongs; acquiring grayscale correction data of the target pixel based on the first cross-talk amount and the second cross-talk amount; and acquiring a corrected grayscale value of the target pixel based on the grayscale correction data.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3A is a table of cross-talk weights for grayscales respectively corresponding to pixels included in the same pixel line or different pixel lines according to one or more embodiments;

FIG. 3B is a table of cross-talk weights for grayscales respectively corresponding to pixels included in the same pixel line or different pixel lines according to one or more embodiments;

FIG. 4A is a table cross-talk weights related to red (R), green (G), and blue (B) subpixels according to one or more embodiments;

FIG. 4B is a table cross-talk weights related to red (R), green (G), and blue (B) subpixels according to one or more embodiments;

FIG. 4C is a table cross-talk weights related to red (R), green (G), and blue (B) subpixels according to one or more embodiments;

FIG. 5A is a table of the cross-talk weights for a plurality of grayscale sections having different lengths according to one or more embodiments;

FIG. 5B is a table of the cross-talk weights for a plurality of grayscale sections having different lengths according to one or more embodiments;

DETAILED DESCRIPTION

Figure 1:
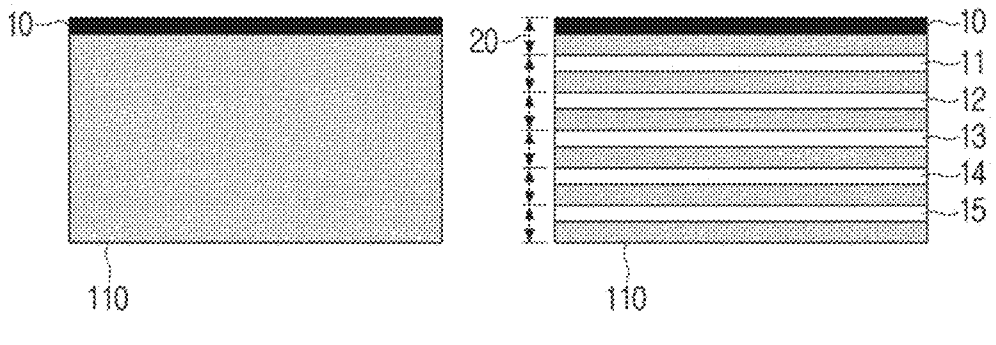
FIG. 1 is a diagram for of cross-talk occurring on a display panel.

Hereinafter, the present disclosure is described in detail with reference to the accompanying drawings.

General terms widely used are selected as terms used in one or more embodiments of the present disclosure in consideration of their functions in the present disclosure, and may be changed based on the intentions of those skilled in the art or a judicial precedent, the emergence of a new technique, or the like. In addition, in a specific case, terms arbitrarily chosen by an applicant may exist. In this case, the meanings of such terms are mentioned in detail in corresponding description portions of the present disclosure. Therefore, the terms used in the present disclosure need to be defined on the basis of the meanings of the terms and the contents throughout the present disclosure rather than simple names of the terms.

In the present disclosure, an expression "have", "may have", "include", "may include" or the like, indicates existence of a corresponding feature (for example, a numerical value, a function, an operation, or a component such as a part), and does not exclude existence of an additional feature.

An expression, "at least one of A or B" may indicate "A" alone, "B" alone, or both of "A and B."

Expressions "first", "second" and the like, used in the present disclosure, may indicate various components regardless of the sequence and/or importance of the components. These expressions are used only to distinguish one component and another component from each other, and do not limit the corresponding components.

In case that any component (for example, a first component) is mentioned to be "(operatively or communicatively) coupled with/to" or "connected to another component" (for example, a second component), it is to be understood that any component may be directly coupled to another component or may be coupled to another component through still another component (for example, a third component).

A term of a singular number used herein is intended to include its plural number unless explicitly indicated otherwise. It is to be understood that a term "include" or "formed of" used in the present disclosure specifies the presence of features, numerals, steps, operations, components, parts, or combinations thereof, mentioned in the present disclosure, and does not preclude the presence or addition of one or more other features, numerals, steps, operations, components, parts, or combinations thereof.

In the present disclosure, a "module" or a "~er/~or" may perform at least one function or operation, and be implemented by hardware, software, or a combination of hardware and software. In addition, a plurality of "modules" or a plurality of "~ers/~ors" may be integrated in at least one module to be implemented by at least one processor except for a "module" or a "~er/or" that needs to be implemented by specific hardware.

In the present disclosure, a "user" may indicate a person who receives content through a display device, and is not limited thereto.

FIG. 1 is a diagram of cross-talk occurring on a display panel.

A general display device 100 may include a display 110 including a plurality of pixel lines, and may display various images through a plurality of pixels included in the display 110. Each of the plurality of pixels included in the display 110 may include a thin film transistor (TFT), and occurrence of the cross-talk (or X-talk) may be caused by electromagnetic coupling between the plurality of TFTs disposed on the display 110.

The display device 100 may be controlled to display black through one pixel line 10 of the display 110 and display gray through the other pixel lines. In this case, the TFT of the pixel included in one pixel line 10 and controlled to display black may affect the TFTs spaced apart from each other by a predetermined distance 20, and included in other pixel lines 11, 12, 13, 14, and 15 to which an image signal is applied (hereinafter, scanned) simultaneously with one pixel line 10.

Here, the pixel included in another pixel line 11, 12, 13, 14, or 15 may be operated with a luminance higher than an ideal luminance corresponding to an output grayscale. In other words, the pixel affected by the cross-talk among the plurality of pixels included in the other pixel lines except for one pixel line 10 may display a brighter color than a color displayed by the pixel not affected by the cross-talk.

On the other hand, a different aspect of the cross-talk may occur if the display device 100 increases the grayscale corresponding to one pixel line 10. The display device 100 may be controlled to display white through one pixel line 10 and gray through the other pixel lines. In this case, the pixel included in another pixel line 11, 12, 13, 14, or 15 that is scanned simultaneously with one pixel line 10 and affected by the cross-talk may be operated with a luminance lower than the ideal luminance corresponding to the output grayscale.

Accordingly, the pixel affected by the cross-talk may display a darker color than a color displayed by the pixel not affected by the cross-talk.

The display device 100 according to one or more embodiments may reduce the cross-talk by estimating an amount of the cross-talk that one pixel line 10 affects another pixel line 11, 12, 13, 14, or 15 scanned simultaneously with one pixel line 10 and an amount of the cross-talk that occurs in the same pixel line, and correcting an output grayscale value of the pixel affected by the estimated cross-talk.

Hereinafter, the description describes various embodiments where the display device 100 acquires histogram information on the basis of the grayscale values of the pixels included in the plurality of pixel lines, estimates the cross-talk amount of a target pixel by utilizing cross-talk weight information and the histogram information for each grayscale corresponding to each of pixels included in the same pixel line or different pixel lines, and compensates for the estimated cross-talk amount.

Figure 2:
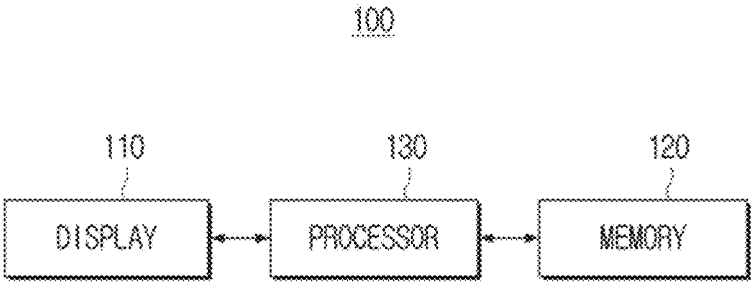
FIG. 2 is a block diagram of a configuration of the display device according to one or more embodiments.

FIG. 2 is a block diagram of the display device according to one or more embodiments.

Referring to FIG. 2, the display device 100 may include the display 110, a memory 120, and a processor 130. In an exemplary embodiment, the processor 130 includes one processor and in another exemplary embodiment, the processor 130 includes a plurality of processors.

The display 110 may be a component displaying the image provided to the user by the display device 100. The display 110 may be implemented as various types of displays such as a liquid crystal display (LCD), an organic light emitting diode (OLED) display, a quantum dot light-emitting diode (QLED) display, and a plasma display panel (PDP). In addition, the display 110 may be implemented as a display including a micro LED which includes light emitting diode (LED) having an element whose size is 100 μm or less.

The display 110 may also include a driving circuit, a backlight unit, and the like, which may be implemented in a form such as the TFT, a low temperature poly silicon (LTPS) TFT, or an organic TFT (OTFT). Meanwhile, the display 110 may be implemented as a flexible display, a three-dimensional (3D) display, or the like.

The display 110 may include the plurality of pixels, and each pixel may include a plurality of subpixels. Each pixel may include three subpixels corresponding to a plurality of lights, such as, red (R), green (G), and blue (B) lights. However, the pixel is not limited thereto, and in some cases, in addition to the red, green, and blue subpixels, the pixel may also include cyan, magenta, yellow, black, or other subpixels. The display 110 in an embodiment may include an LED panel, and in this case, each of the plurality of pixels may include the LED pixel.

The memory 120 may store data necessary for the various embodiments of the present disclosure. The memory 120 may be implemented as a memory embedded in the display device 100, or implemented as a memory detachable from the display device 100, based on a data storage purpose. Data for driving the display device 100 may be stored in the memory embedded in the display device 100, and data for an extension function of the display device 100 may be stored in the memory detachable from the display device 100. Meanwhile, the memory embedded in the display device 100 may be implemented as at least one of a volatile memory (for example, a dynamic random access memory (DRAM), a static RAM (SRAM), or a synchronous dynamic RAM (SDRAM)), a non-volatile memory (for example, an one time programmable read only memory (OTPROM), a programmable ROM (PROM), an erasable and programmable ROM (EPROM), an electrically erasable and programmable ROM (EEPROM), a mask ROM, or a flash ROM, a flash memory (for example, a NAND flash or a NOR flash), a hard drive, or a solid state drive (SSD)). In addition, the memory detachable from the display device 100 may be implemented in the form of a memory card (for example, a compact flash (CF), a secure digital (SD), a micro secure digital (Micro-SD), a mini secure digital (Mini-SD), an extreme digital (xD), or a multi-media card (MMC)), or an external memory which may be connected to a universal serial bus (USB) port (for example, a USB memory).

The memory 120 may store a first cross-talk weight based on the pixel included in another pixel line scanned simultaneously with the pixel line to which a pixel (hereinafter, target pixel) which is a target of a grayscale value adjustment for cross-talk reduction belongs, and a second cross-talk weight based on the pixel included in the pixel line to which the target pixel belongs.

Here, the first cross-talk weight and the second cross-talk weight may each include a cross-talk weight for each grayscale corresponding to a combination of the grayscale value of the target pixel and the grayscale value of the pixel (hereinafter, a source pixel) that causes the cross-talk of the target pixel. According to one or more embodiments, the first cross-talk weight and the second cross-talk weight may each include the cross-talk weight for each grayscale of the source pixel corresponding to a first grayscale value of the target pixel, and the cross-talk weight for each grayscale of the source pixel corresponding to a second grayscale value of the target pixel (or the grayscale value different from the first grayscale value). Here, the grayscale value of the target pixel or the grayscale value of the source pixel may indicate an average value of a R grayscale value, a G grayscale value and a B grayscale value corresponding to each pixel, and is not limited thereto.

In addition, the cross-talk weight for each grayscale may include the cross-talk weight for each grayscale of at least one of R, G, or B subpixel of the source pixel corresponding to the R grayscale value of the target pixel, the cross-talk weight for each grayscale of at least one of R, G, or B subpixel of the source pixel corresponding to the G grayscale value of the target pixel, and the cross-talk weight for each grayscale of at least one of the R, G, or B subpixel of the source pixel corresponding to the B grayscale value of the target pixel.

The processor 130 may control overall operations of the display device 100. In detail, the processor 130 may be connected to each component of the display device 100 to thus control the overall operations of the display device 100. The processor 130 may be connected to the display 110 and the memory 120 to thus control the operation of the display device 100.

According to one or more embodiments, the processor 130 may be indicated by any of various names such as a digital signal processor (DSP), a microprocessor, a central processing unit (CPU), a micro controller unit (MCU), a micro processing unit (MPU), a neural processing unit (NPU), a controller, and an application processor (AP), and the present disclosure uses its name as the processor 130.

The processor 130 may be implemented as a system-on-chip (SoC) or a large scale integration (LSI), or may be implemented in the form of a field programmable gate array (FPGA). In addition, the processor 130 may include the volatile memory such as the SRAM.

The processor 130 may simultaneously apply the image signal to the plurality of pixel lines spaced apart from each other by the predetermined distance. The processor 130 may identify the plurality of pixel lines spaced apart from each other by the predetermined distance into one pixel line cluster, and apply the image signal simultaneously to the pixel lines included in one pixel line cluster.

The processor 130 may identify a set of pixel lines including 5n+kth (here, n is a non-negative integer, and k is a natural number of 5 or less) pixel lines spaced apart from each other by a 5-line distance as the kth pixel line cluster. In addition, the processor 130 may apply the image signal in order from the first pixel line cluster. In this case, the processor 130 may display an image corresponding to one frame by sequentially applying the image signal up to the fifth pixel line cluster. However, the present disclosure is not limited hereto. The processor 130 may identify the plurality of pixel lines spaced apart from each other by the predetermined distance that are different from the 5-line distance as one pixel line cluster, and apply the image signal to the identified pixel line clusters in order.

To reduce the cross-talk, the processor 130 may acquire each grayscale value of the pixels included in the plurality of pixel lines spaced apart from each other by the predetermined distance among the plurality of pixels included in the display 110. The processor 130 may acquire n grayscale value data sets by acquiring the grayscale value of the plurality of pixels belonging to each of the kth pixel line cluster including the pixel lines spaced apart from each other by an n-line distance.

Next, the processor 130 may compensate for the cross-talk occurring in the display 110 in software by acquiring n grayscale correction data for correcting the grayscale value included in the image signal applied to each of n pixel line clusters based on n grayscale value data. Hereinafter, the description describes an operation of the processor 130 to acquire first grayscale correction data corresponding to the first pixel line cluster among the n grayscale correction data, and the operation of the processor 130, which is described below, may be similarly performed on the other n−1 pixel line clusters except for the first pixel line cluster. In addition, the operation of the processor 130, which is described below, may be performed using one frame of an input image as a minimum unit, and is not limited thereto.

The processor 130 may acquire first histogram information indicating the number of pixels included in another pixel line scanned simultaneously with the pixel line to which the target pixel for each grayscale section belongs, and the second histogram information indicating the number of pixels included in the pixel line to which the target pixel for each grayscale section belongs, on the basis of the acquired grayscale value. The processor 130 may acquire the first histogram information and the second histogram information by classifying an entire grayscale range into the plurality of grayscale sections, and identifying the number of pixels corresponding to each of the plurality of grayscale sections on the basis of each grayscale value of the pixels included in the first pixel line cluster.

In particular, with regard to acquiring the first histogram information, the processor 130 may be able to perform a vertical cross-talk compensation even in case that the target pixel belongs to any pixel line among the plurality of pixel lines belonging to the first pixel line cluster. Therefore, assume a case where the processor 130 acquires the first histogram information which includes the plurality of histogram information corresponding to a case where the target pixel belongs to each of the plurality of pixel lines included in the first pixel line cluster to identify the accurate "number of pixels included another pixel line scanned simultaneously with the pixel line to which the target pixel belongs" and each mapped to the grayscale section in the first histogram information.

However, in this case, calculations and information processing processes, involved in the operation of the processor 130, may become complicated, and it is thus difficult for the processor to efficiently perform the vertical cross-talk compensation. To overcome this problem, the processor 130 may acquire the histogram information indicating the number of pixels for each grayscale for the plurality of pixels included in all of m pixel lines in case that the m pixel lines belong to the first pixel line cluster, and acquire the first histogram information on the basis of a result of multiplying a frequency for each grayscale section in the acquired histogram information by (m−1)/m.

As a result, the processor 130 may efficiently perform the vertical cross-talk compensation by acquiring the first histogram information which may be considered to indicate the number of pixels included in another pixel line scanned simultaneously with the pixel line to which the target pixel belongs even though the processor does not acquire the histogram information that actually reflects the number of pixels included in another pixel line scanned simultaneously with the pixel line to which the target pixel belongs. Hereinafter, for convenience, the description describes an operation of the display device 100 on a premise that the display device 100 acquires the first histogram information by using the above-described method. However, an operation of the cross-talk compensation performed by the display device 100 is not necessarily limited to the above-described method.

On the contrary, the second histogram information may be the histogram information that actually reflects the number of pixels included in the pixel line to which the target pixel belongs. Therefore, the second histogram information may include the plurality of histogram information each corresponding to the case where the target pixel belongs to each of the plurality of pixel lines included in the first pixel line cluster.

Assume that the entire grayscale range includes natural numbers between zero and 255 (8 bits). In this case, the processor 130 may classify the grayscale range between zero and 255 as the plurality of grayscale sections, and acquire the first histogram information and the second histogram information, indicating the number of pixels corresponding to each grayscale section. The description above describes that the processor 130 classifies the grayscale range in an 8 bit format into the plurality of sections, and the entire grayscale range may be configured in a format other than the 8 bit format.

The processor 130 may acquire the first histogram information and the second histogram information by classifying a first grayscale range less than a critical value in the entire grayscale range as the plurality of grayscale sections of a first length, and classifying a second grayscale range of the critical value or more as the plurality of grayscale sections of a second length greater than the first length. In this case, the first grayscale range including a lower grayscale region may be divided more tightly than the second grayscale range including a higher grayscale region. However, the operation of the processor 130 is not limited to this grayscale section classification method.

Next, the processor 130 may identify each of the cross-talk (hereinafter, the vertical cross-talk) caused by another pixel line simultaneously scanned with the pixel line to which the target pixel belongs and the cross-talk (hereinafter, horizontal cross-talk) caused by the pixel included in the pixel line to which the target pixel belongs.

To this end, the processor 130 may identify the vertical cross-talk by using the first weight stored in the memory 120 and the first histogram information, and identify the horizontal cross-talk by using the second weight stored in the memory 120 and the second histogram information.

According to one or more embodiments, the processor 130 may estimate a vertical cross-talk amount based on the pixels included in another pixel line scanned simultaneously with the pixel line to which the target pixel belongs by cumulatively adding the number of pixels corresponding to each grayscale section in the first histogram information multiplied by the first cross-talk weight related to a degree to which the pixel corresponding to each grayscale section affects the target pixel. The processor 130 may estimate a horizontal cross-talk amount based on the pixels included in the pixel line to which the target pixel belongs by cumulatively adding the number of pixels corresponding to each grayscale section in the second histogram information multiplied by the second cross-talk weight related to a degree to which the pixel corresponding to each grayscale section affects the target pixel. The description describes below a detailed method of estimating the vertical cross-talk amount and the horizontal cross-talk amount.

Next, the processor 130 may acquire the grayscale correction data of the target pixel on the basis of the vertical cross-talk amount and the horizontal cross-talk amount. Here, the grayscale correction data may include a gain value for adjusting the grayscale value to be applied to the target pixel for each of the plurality of grayscale sections to which the target pixel belongs, and is not limited thereto.

The processor 130 may identify, from the acquired grayscale correction data of the target pixel, the grayscale section to which each grayscale value of the pixels included in the plurality of pixel lines belonging to the first pixel line cluster belongs, and may also acquire an interpolated gain value on the basis of the gain value corresponding to the identified grayscale section, and the gain value corresponding to the grayscale section adjacent to the identified grayscale section. Its details are described with reference to FIG. 8C.

The processor 130 may acquire the grayscale correction data corresponding to one pixel line cluster among the plurality of pixel line clusters through the above process. The processor 130 may compensate for the cross-talk by acquiring a corrected grayscale value of the target pixel included in one pixel line cluster on the basis of the grayscale correction data. The processor may perform gamma conversion on the grayscale correction data of the target pixel, and apply the image signal to the first pixel line cluster on the basis of the converted grayscale correction data.

The processor may complete a cross-talk compensation operation for one frame of the input image by similarly performing the above-described operation for the n−1 pixel line clusters except for the first pixel line cluster.

FIGS. 3A and 3B are diagrams tables of the cross-talk weights for the grayscales respectively corresponding to the pixels included in the same pixel line or different pixel lines according to one or more embodiments.

FIG. 3A is a table of the first cross-talk weight corresponding to grayscale values of a source pixel P1 and a target pixel P2, belonging to different pixel lines.

Referring to FIG. 3A, the first cross-talk weight information 310 indicating a degree to which the source pixel P1, stored in the memory 120 and included in another pixel line scanned simultaneously with the pixel line to which the target pixel P2 belongs, affects the target pixel P2 may include the cross-talk weight related to a combination of the grayscale value of the source pixel P1 and the grayscale value of the target pixel P2.

The first cross-talk weight information 310 may include a weight acquired by measurement in advance. The first cross-talk weight information 310 may be acquired on the basis of data acquired by measuring twenty-five cross-talk weights corresponding to respective combinations of five representative values included in a grayscale range 311 of the source pixel P1 and the five representative values included in a grayscale range 312 of the target pixel P2, and is not limited thereto.

In case of each of the grayscale ranges 311 and 312 is configured in the 8 bit format, the five representative values included in each of the grayscale ranges 311 and 312 may be zero, 51, 102, 153, and 204, and are not limited thereto. In addition, the representative values included in each of the grayscale ranges 311 and 312, included in the first cross-talk weight information 310, may be more or less than five. In this case, the first cross-talk weight information 310 may include weights as many as a square n2 of the number n of the representative values included in each of the grayscale ranges 311 and 312.

In case that the target pixel P2 has the grayscale value of 102, according to the first cross-talk weight information 310, −100 may be a weight related to the cross-talk affecting the target pixel P2 from the source pixel P1 having the grayscale value of 51. The cross-talk amount affecting the target pixel P2 from the source pixel P1 may be determined by a value acquired by multiplying the cross-talk weight, corresponding to the combination of the grayscale value of the source pixel P1 and the grayscale value of the target pixel P2, by the grayscale value of the source pixel P1. The processor 130 may identify, as −5100, the cross-talk amount by which the target pixel P2 having the grayscale value of 102 is affected by one source pixel P1 having the grayscale value of 51.

Further, the processor 130 may identify the number of the source pixels P1 matched to each of the five representative values included in the grayscale range 311 of the source pixel P1 on the basis of the acquired first histogram information, and estimate the vertical cross-talk amount on the basis of the identified number and the first cross-talk weight information 310.

FIG. 3B is a diagram of the second cross-talk weight corresponding to grayscale values of the source pixel P1 and the target pixel P2, belonging to the same pixel line.

Referring to FIG. 3B, second cross-talk weight information 320 indicating a degree to which the source pixel P1, stored in the memory 120 and included in the pixel line to which the target pixel P2 belongs, affects the target pixel P2 may include the cross-talk weight corresponding to a combination of the grayscale value of the source pixel P1 and the grayscale value of the target pixel P2.

The second cross-talk weight information 320 may include a weight acquired by measurement in advance. The second cross-talk weight information 320 may be acquired on the basis of data acquired by measuring twenty-five cross-talk weights corresponding to respective combinations of the five representative values included in a grayscale range 321 of the source pixel P1 and the five representative values included in a grayscale range 322 of the target pixel P2, and is not limited thereto.

In case of each of the grayscale ranges 321 and 322 is configured in the 8 bit format, the five representative values included in each of the grayscale ranges 321 and 322 may be zero, 51, 102, 153, and 204, and are not limited thereto. In addition, the representative values included in each of the grayscale ranges 321 and 322, included in the second cross-talk weight information 320, may be more or less than five. In this case, the second cross-talk weight information 320 may include weights as many as a square n2 of the number n of the representative values included in each of the grayscale ranges 321 and 322.

In case that the target pixel P2 has the grayscale value of 102, according to the second cross-talk weight information 320, −200 may be a weight related to the cross-talk affecting the target pixel P2 from the source pixel P1 having the grayscale value of 51. The processor 130 in an example may identify, as −10200, the cross-talk amount by which the target pixel P2 having the grayscale value of 102 is affected by one source pixel P1 having the grayscale value of 51.

Further, the processor 130 may identify the number of the source pixels P1 matched to each of the five representative values included in the grayscale range 321 of the source pixel P1 on the basis of the acquired second histogram information, and estimate the horizontal cross-talk amount on the basis of the identified number and the second cross-talk weight information 320.

The processor 130 may estimate a total amount of the cross-talk affecting the target pixel P2 by summing the vertical cross-talk amount and the horizontal cross-talk amount, and acquire the grayscale correction data of the target pixel P2 on the basis of the estimated total cross-talk amount.

FIGS. 4A to 4C are diagrams of the cross-talk weights related to the red (R), green (G), and blue (B) subpixels according to one or more embodiments.

The first cross-talk weight information related to the source pixel P1 and the target pixel P2, which belong to the different pixel lines, may include cross-talk weight information 410, 420, and 430 respectively shown in FIGS. 4A to 4C.

FIG. 4A shows the cross-talk weight information 410 including an R cross-talk weight for each grayscale of the source pixel P1 corresponding to the R grayscale value of the target pixel P2. The first cross-talk weight information 410 may be acquired on the basis of data acquired by measuring twenty-five cross-talk weights corresponding to respective combinations of the five representative values included in an R grayscale range 411 of the source pixel P1 and the five representative values included in an R grayscale range 412 of the target pixel P2, and is not limited thereto.

In case that the target pixel P2 has the R grayscale value of 102, according to the cross-talk weight information 410, −70 may be a weight related to the cross-talk affecting the target pixel P2 from the source pixel P1 having the R grayscale value of 51.

The processor 130 may identify, as −3570, the cross-talk amount by which the target pixel P2 having the R grayscale value of 102 is affected by the source pixel P1 having the R grayscale value of 51.

FIG. 4B shows the cross-talk weight information 420 including a G cross-talk weight for each grayscale of the source pixel P1 corresponding to the G grayscale value of the target pixel P2. The cross-talk weight information 420 may be acquired on the basis of data acquired by measuring twenty-five cross-talk weights corresponding to respective combinations of the five representative values included in a G grayscale range 421 of the source pixel P1 and the five representative values included in a G grayscale range 422 of the target pixel P2.

In case that the target pixel P2 has the G grayscale value of 102, according to the cross-talk weight information 420, −50 may be a weight related to the cross-talk affecting the target pixel P2 from the source pixel P1 having the G grayscale value of 51.

The processor 130 in an example may identify, as −2550, the cross-talk amount by which the target pixel P2 having the G grayscale value of 102 is affected by the source pixel P1 having the G grayscale value of 51.

FIG. 4C shows the cross-talk weight information 430 including a B cross-talk weight for each grayscale of the source pixel P1 corresponding to the B grayscale value of the target pixel P2. The cross-talk weight information 430 may be acquired on the basis of data acquired by measuring twenty-five cross-talk weights corresponding to respective combinations of the five representative values included in a B grayscale range 431 of the source pixel P1 and the five representative values included in a B grayscale range 432 of the target pixel P2.

In case that the target pixel P2 has the B grayscale value of 102, according to the cross-talk weight information 430, −60 may be a weight related to the cross-talk affecting the target pixel P2 from the source pixel P1 having the B grayscale value of 51.

The processor 130 may identify, as −3060, the cross-talk amount by which the target pixel P2 having the B grayscale value of 102 is affected by the source pixel P1 having the B grayscale value of 51.

The processor 130 may perform the cross-talk compensation by using the cross-talk weights related to the R, G, and B subpixels. To this end, in acquiring the first histogram information, the processor 130 may separately acquire three histogram information respectively corresponding to the R, G, and B grayscale values.

The processor 130 may identify the number of the source pixels P1 matched to each of the five representative values included in the grayscale ranges 411, 421, and 431 of the source pixel P1 on the basis of the separately-acquired three histogram information, and estimate the vertical cross-talk amount related to the R, G, and B subpixels on the basis of the identified number and the cross-talk weight information 410, 420, and 430.

In this case, the processor 130 may acquire the grayscale correction data, including the gain value to adjust the R grayscale value of the target pixel, the gain value to adjust the G grayscale value of the target pixel, and the gain value to adjust the B grayscale value of the target pixel data, on the basis of the vertical cross-talk amount related to the R, G, and B subpixels and the horizontal cross-talk amount related to the R, G, B subpixels acquired by separate operations.

Referring to FIGS. 4A to 4C, the description describes only the cross-talk weight related to a combination of the grayscale values of the same color of the source pixel P1 and the target pixel P2. However, the memory 120 may store the cross-talk weight information, including the cross-talk weight related to a combination of the grayscale values of different colors of the source pixel P1 and the target pixel P2.

According to one or more embodiments, the memory 120 may also store at least one of the G or B cross-talk weight of the source pixel P1 corresponding to the R grayscale value of the target pixel P2 for each grayscale, the R or B cross-talk weight for each grayscale of the source pixel P1 corresponding to the G grayscale value of the target pixel P2, or the R or G cross-talk weight for each grayscale of the source pixel P1 corresponding to the B grayscale value of the target pixel P2.

In addition, the description above describes only the first cross-talk weight related to the R, G, and B subpixels, included in the source pixel P1 and the target pixel P2, belonging to the different pixel lines. However, the memory 120 may also store the second cross-talk weight and the first cross-talk weight related to the R, G, and B subpixels, included in the source pixel P1 and the target pixel P2, belonging to the same pixel line. The processor 130 may estimate the horizontal cross-talk amount related to the R, G, and B subpixels on the basis of the second cross-talk weight and the second histogram information related to the R, G, and B subpixels.

FIG. 5A is a diagram of the first cross-talk weight for the plurality of grayscale sections having the different lengths according to one or more embodiments.

Referring to FIG. 5A, first cross-talk weight information 510 may be acquired on the basis of data acquired by measuring forty-nine cross-talk weights corresponding to respective combinations of seven representative values included in a grayscale range 511 of the source pixel P1 and seven representative values included in a grayscale range 512 of the target pixel P2.

In case of each of the grayscale ranges 511 and 512 is configured in the 8 bit format, the seven representative values included in each of the grayscale ranges 511 and 512 may be zero, 17, 34, 51, 102, 153, and 204, and are not limited thereto.

In particular, a weight related to the cross-talk affected by the source pixel P1 in case that the target pixel P2 has the grayscale value 0, 17, or 34 within a lower grayscale range 514 may be rapidly changed based on a change in the grayscale value of the source pixel P1 compared to a case where the target pixel P2 has the grayscale value 51, 102, 153, or 204 within a higher grayscale range. Therefore, a distance (i.e., distance of the grayscale section) between the representative values included in the lower grayscale range 514 within the grayscale range of the target pixel P2 and a distance (i.e., distance of the grayscale section) between the representative values included in a lower grayscale range 513 within the grayscale range of the source pixel P1 may be shorter than a distance (i.e., distance of the grayscale section) between the representative values included in the higher grayscale range within the grayscale range of each pixel.

FIG. 5B is a diagram of the second cross-talk weight for the plurality of grayscale sections having the different lengths according to one or more embodiments.

Referring to FIG. 5B, second cross-talk weight information 520 may be acquired on the basis of data acquired by measuring forty-nine cross-talk weights corresponding to respective combinations of the seven representative values included in a grayscale range 521 of the source pixel P1 and the seven representative values included in a grayscale range 522 of the target pixel P2.

In case of each of the grayscale ranges 521 and 522 is configured in the 8 bit format, the seven representative values included in each of the grayscale ranges 521 and 522 may be zero, 17, 34, 51, 102, 153, and 204, and are not limited thereto.

Like the first cross-talk weight information 510, in the second cross-talk weight information 520, a distance (i.e., distance of the grayscale section) between the representative values included in a lower grayscale range 524 within the grayscale range of the target pixel P2 and a distance (i.e., distance of the grayscale section) between the representative values included in a lower grayscale range 523 within the grayscale range of the source pixel P1 may also be shorter than a distance (i.e., distance of the grayscale section) between the representative values included in a higher grayscale range within the grayscale range of each pixel.

Figure 6A:
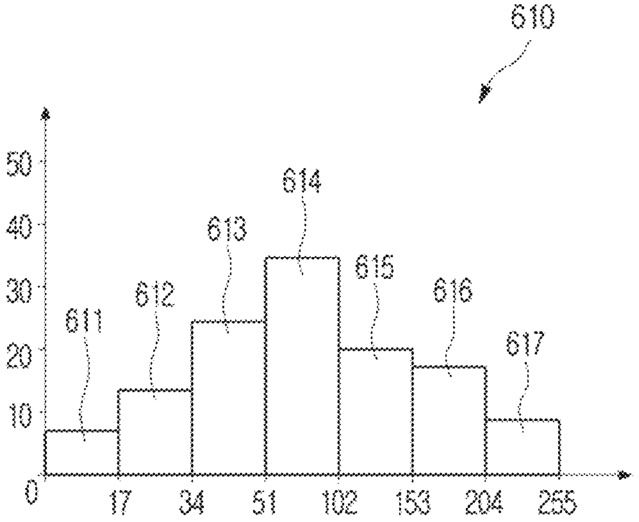
FIG. 6A is a graph of histogram information corresponding to pixels included in the same pixel line or different pixel lines from a target pixel according to one or more embodiments.

FIG. 6A is a diagram of the first histogram information corresponding to the pixels included in the same pixel line or different pixel lines from the target pixel according to one or more embodiments.

Figure 8A:
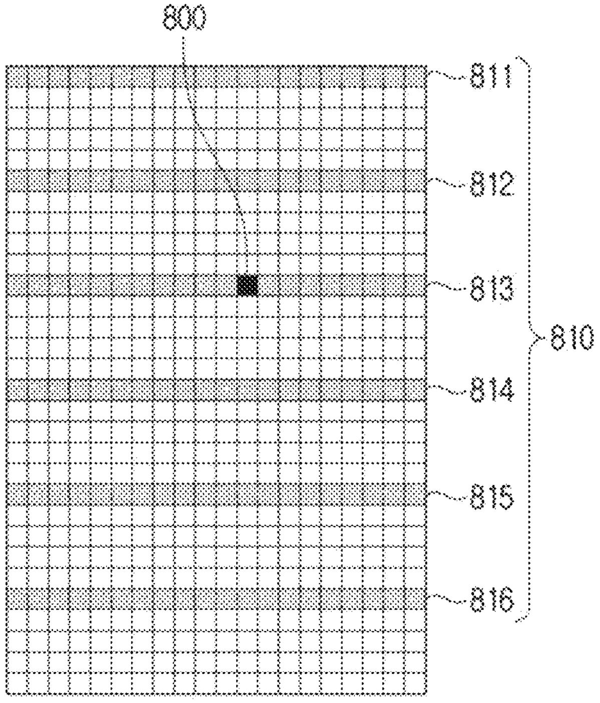
FIG. 8A is a diagram of a cross-talk compensation operation for each of pixel lines that are simultaneously scanned according to one or more embodiments.

The processor 130 may acquire first histogram information 610 on the basis of each grayscale value of the pixels included in one pixel line cluster. As shown in FIG. 8A, the display 110 may have a resolution of 20*30. In this case, the processor 130 may identify a pixel line cluster 810 including a plurality of pixel lines 811, 812, 813, 814, 815, and 816 among the 30 pixel lines, which are spaced apart from each other by the 5-line distance and scanned simultaneously, and acquire the first histogram information 610 on the basis of each grayscale value of the plurality of pixels included in the pixel line cluster 810.

Referring to FIG. 6A, 6 pixels may be included in a first grayscale section 611, 13 pixels may be included in a second grayscale section 612, 24 pixels may be included in a third grayscale section 613, 33 pixels may be included in a fourth grayscale section 614, 19 pixels may be included in a fifth grayscale section 615, 17 pixels may be included in a sixth grayscale section 616, and 8 pixels may be included in a seventh grayscale section 617.

The processor 130 may identify the cross-talk weight for each grayscale of the source pixels corresponding to a lower limit value of the grayscale section including the grayscale value of the target pixel P2 among the first cross-talk weight information stored in the memory 120. According to one or more embodiments, 25 may be the grayscale value of the target pixel P2 included in the pixel line. In this case, the processor 130 may identify the cross-talk weight for each grayscale of the source pixels corresponding to 17, which is a lower limit value of the grayscale section 612 to which the grayscale value of 25 belongs.

Referring to FIG. 5A, the representative value included in the grayscale range 512 of the target pixel P2 and the grayscale range 511 of the source pixel P1 may be a value corresponding to the lower limit value of the plurality of grayscale sections 611 to 617 included in the first histogram information 610. The processor 130 may identify the cross-talk weight corresponding to each representative value included in the grayscale range 512 of the target pixel P2, and calculate the vertical cross-talk amount according to the grayscale value of the target pixel P2 on the basis of the identified weight and the first histogram information 610.

According to one or more embodiments, the target pixel P2 may have the grayscale value of 17. In this case, the processor 130 may identify a weight 515 related to the cross-talk affected by the grayscale of the source pixel P1. In addition, the processor 130 may calculate the cross-talk amount by which the target pixel P2 is affected by the source pixel P1 belonging to the different pixel line from the target pixel P2 on the basis of the frequency for each grayscale section included in the first histogram information 610 and the identified weight 515. In this case, the processor 130 may calculate the vertical cross-talk amount by which the target pixel P2 is affected by the source pixel P1 by cumulatively adding the lower limit value of each grayscale section, to which the grayscale value of the source pixel P1 belongs, among the identified weight 515, multiplied by the weight corresponding to the lower limit value, and the frequency for each grayscale section, to which the grayscale value of the source pixel P1 belongs, in the first histogram information 610.

The processor may identify $\{0*(-1000)*6\}+\{17*0*13\}+\{34*300*24\}+\{51*200*33\}+\{102*150*19\}+\{153*200*17\}+\{204*300*8\}=1{,}912{,}790$ as the vertical cross-talk amount received by the target pixel P2 having the grayscale value of 17.

Likewise, the processor 130 may also identify the vertical cross-talk amount received by the target pixel P2 in case that the target pixel P2 has the representative values other than 17 included in the grayscale range 512 of the target pixel P2.

Figure 6B:
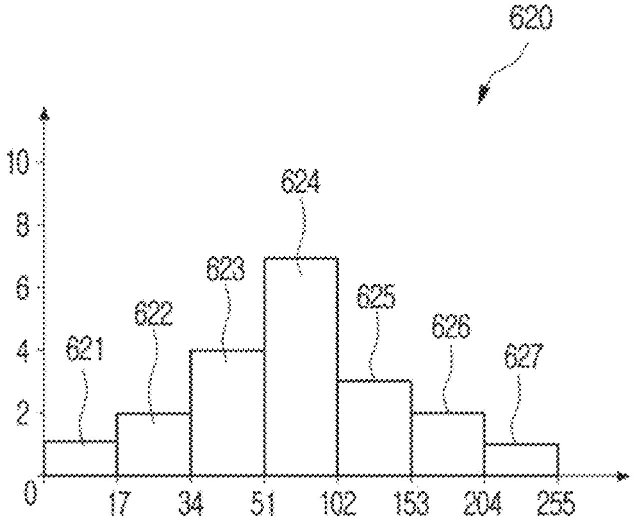
FIG. 6B is a graph of histogram information corresponding to pixels included in the same pixel line or different pixel lines from a target pixel according to one or more embodiments.

FIG. 6B is a diagram of the histogram information corresponding to the pixels included in the same pixel line from the target pixel according to an embodiment of the present disclosure.

The processor 130 may acquire second histogram information 620 on the basis of each grayscale value of the pixels included in one pixel line cluster. The processor 130 may acquire the second histogram information 620 on the basis of each grayscale value of the pixels included in the first pixel line cluster 810.

Here, the second histogram information 620 may include the plurality of histogram information corresponding to a case where the target pixel belongs to each of the plurality of pixel lines included in the first pixel line cluster 810. In this case, the second histogram information 620 may include six histogram information equal to the number of pixel lines included in the first pixel line cluster 810. In particular, FIG. 6B shows the second histogram information 620 indicating the number of pixels for each grayscale section corresponding to a case where the target pixel 800 belongs to a third pixel line 813 included in the first pixel line cluster 810.

Referring to FIG. 6B, 1 pixel may be included in a first grayscale section 621, 2 pixels may be included in a second grayscale section 622, 4 pixels may be included in a third grayscale section 623, 7 pixels may be included in a fourth grayscale section 624, 3 pixels may be included in a fifth grayscale section 625, 2 pixels may be included in a sixth grayscale section 626, and 1 pixel may be included in a seventh grayscale section 627.

The processor 130 may identify the cross-talk weight for each grayscale of the source pixels corresponding to a lower limit value of the grayscale section including the grayscale value of the target pixel P2 among the second cross-talk weight information stored in the memory 120. According to one or more embodiments, 25 may be the grayscale value of the target pixel P2 included in the pixel line. In this case, the processor 130 may identify the cross-talk weight for each grayscale of the source pixels corresponding to 17, which is a lower limit value of the grayscale section 622 to which the grayscale value of 25 belongs.

Referring to FIG. 5B, each representative value included in the grayscale range 522 of the target pixel P2 or the grayscale range 521 of the source pixel P1 may be a value corresponding to a lower limit value of the plurality of grayscale sections 621 to 627 included in the second histogram information 620. The processor 130 may identify the cross-talk weight corresponding to each representative value included in the grayscale range 522 of the target pixel P2, and calculate the horizontal cross-talk amount according to the grayscale value of the target pixel P2 on the basis of the identified weight and the second histogram information 620.

According to one or more embodiments, the target pixel P2 may have the grayscale value of 17. In this case, the processor 130 may identify a weight 525 related to the cross-talk affected by the grayscale of the source pixel P1. In addition, the processor 130 may calculate the cross-talk amount by which the target pixel P2 is affected by the source pixel P1 belonging to the same pixel line as the target pixel P2 on the basis of the frequency for each grayscale section included in the second histogram information 620 and the identified weight 525. In this case, the processor 130 may calculate the horizontal cross-talk amount by which the target pixel P2 is affected by the source pixel P1 by cumulatively adding the lower limit value of each grayscale section, to which the grayscale value of the source pixel P1 belongs, among the identified weights 525, multiplied by the weight corresponding to the lower limit value, and the frequency for each grayscale section, to which the grayscale value of the source pixel P1 belongs, in the second histogram information 620.

The processor 130 may identify {0*(−2000)*1}+{17*0*2}+{34*600*600}+{51*400*7}+{102*3*3}+{153*400*2}+{204*600*1}=561,000 as the horizontal cross-talk amount received by the target pixel 800 belonging to the third pixel line 813 and having the grayscale value of 17.

Likewise, the processor 130 may also identify the horizontal cross-talk amount received by the target pixel P2 in case that the target pixel P2 has the representative values other than 17 included in the grayscale range 522 of the target pixel P2. In addition, the processor 130 may also identify the horizontal cross-talk amount corresponding to a case where the target pixel P2 belongs to each of the other pixel lines of the first pixel line cluster 810 except for the third pixel line 813. In this case, the processor 130 may identify a total of six horizontal cross-talk amounts for the first pixel line cluster 810.

Figure 7:
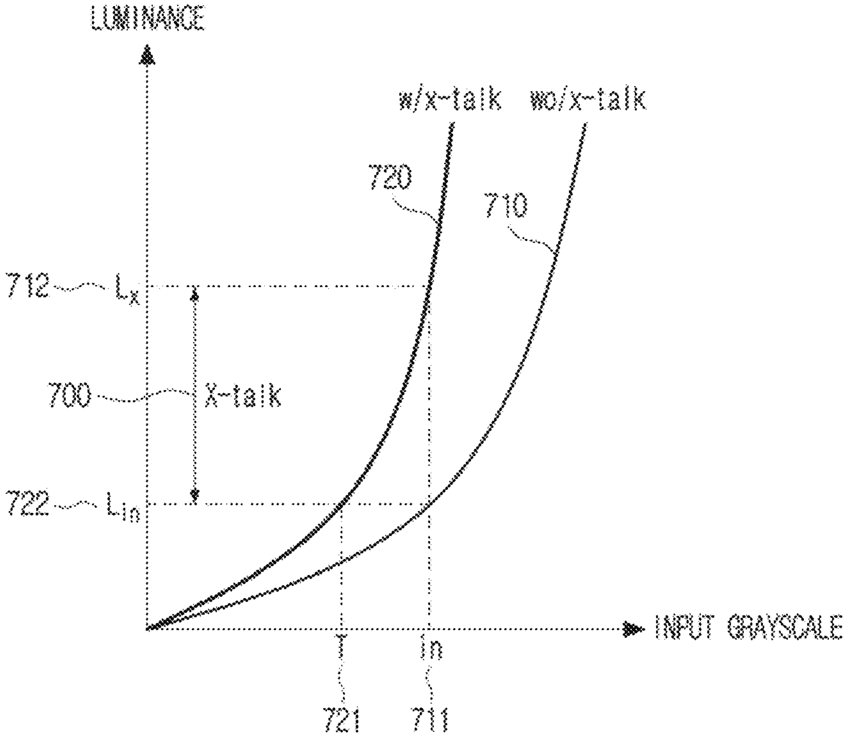
FIG. 7 is a graph of a grayscale correction data acquisition operation based on a cross-talk amount according to one or more embodiments.

FIG. 7 is a diagram of the grayscale correction data acquisition operation based on the cross-talk amount according to one or more embodiments.

The processor 130 may identify a total cross-talk amount 700 of the target pixel on the basis of the vertical cross-talk amount of a specific pixel line cluster and acquired on the basis of the description provided with respect to FIGS. 6A and 6B, and the horizontal cross-talk amount corresponding to the case where the target pixel belongs to each of the plurality of pixel lines included in the pixel line cluster.

The plurality of horizontal cross-talk amounts may be identified as equal to the number of pixels included in the pixel line cluster. Therefore, referring to FIG. 7, the description particularly describes the operation of the processor 130 to acquire the grayscale correction data based on the total cross-talk amount 700 of the third pixel line 813 of FIG. 8A.

The processor 130 may identify a relationship 710 between the grayscale value of the target pixel and an output luminance in case of being not affected by the total cross-talk amount 700. In addition, the processor 130 may identify, as the target luminance, an output luminance 721 corresponding to an input grayscale value 711 of the target pixel, and identify a luminance 722 at which the target pixel is actually operated on the basis of the target luminance 721 and the cross-talk amount 700 affecting the target pixel.

The processor 130 may also identify a relationship 720 between the output luminance and the grayscale value of the pixel affected by the cross-talk 700 on the basis of the luminance 722 at which the target pixel affected by the cross-talk 700 is actually operated. The processor 130 may acquire, as the target grayscale value, a grayscale value 712 that the target pixel affected by the cross-talk 700 is required to have to output the target luminance 721 on the basis of the target luminance 721 and the relationship 720 between the output luminance and the grayscale value of the target pixel affected by the cross-talk 700.

The processor 130 may identify, as the gain value corresponding to the specific input grayscale 711 of the target pixel, T/in acquired by dividing the target grayscale value 721 by the input grayscale value 711 to compensate for the cross-talk 700, and acquire the grayscale correction data including the identified gain value.

According to another embodiment, the processor 130 may identify the target grayscale value by considering only the vertical cross-talk, acquire the first grayscale correction data including a first gain value corresponding to the specific input grayscale of the target pixel on the basis of the identified target grayscale value, then acquire second grayscale correction data including a second gain value acquired by considering the horizontal cross-talk for each pixel line included in the pixel line cluster, and perform the cross-talk compensation on the basis of the acquired first grayscale correction data and second grayscale correction data.

Figure 8B:
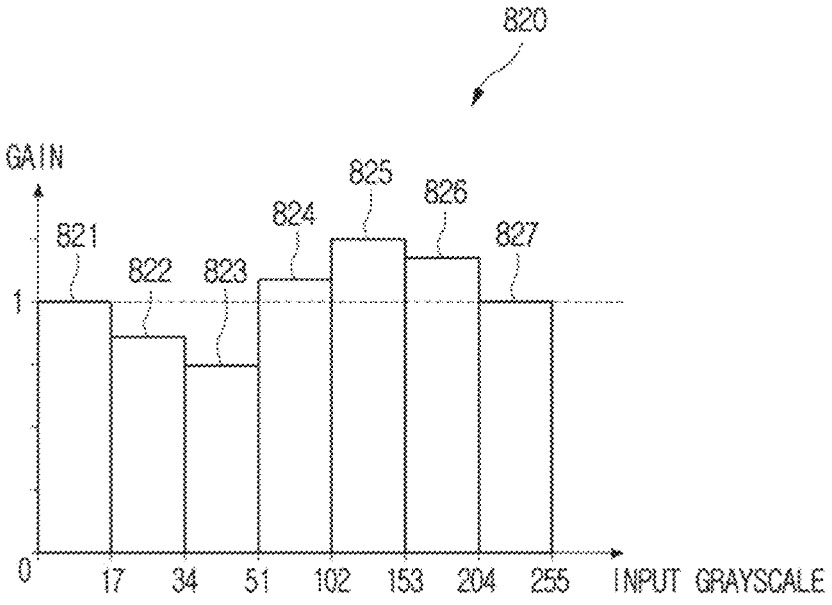
FIG. 8B is a diagram of a cross-talk compensation operation for each of pixel lines that are simultaneously scanned according to one or more embodiments.
Figure 8C:
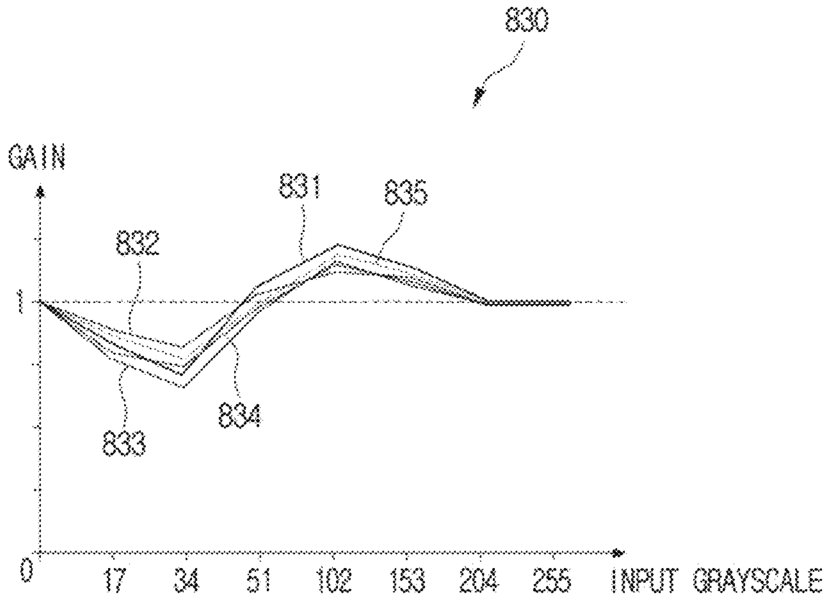
FIG. 8C is a diagram of a cross-talk compensation operation for each of pixel lines that are simultaneously scanned according to one or more embodiments.

FIGS. 8A to 8C are diagrams of the cross-talk compensation operation for each of pixel lines that are simultaneously scanned according to one or more embodiments.

Referring to FIG. 8A, the display 110 may include 30 pixel lines, and the processor 130 may simultaneously apply the image signal to the plurality of pixel lines spaced apart from each other by the 5-line distance. The processor 130 may simultaneously apply the image signal to the pixel lines 811, 812, 813, 814, 815, and 816 belonging to the first pixel line cluster 810.

The display 110 may include 4 pixel line clusters in addition to the first pixel line cluster 810, and the processor 130 may perform the cross-talk compensation operation for each pixel line cluster by calculating and summing the vertical cross-talk amount and the horizontal cross-talk amount of the other four pixel line clusters, respectively.

FIG. 8B shows a gain value 820 corresponding to the grayscale of the target pixel included in the grayscale correction data of the first pixel line cluster 810, and especially shows a gain value for each input grayscale of the target pixel calculated based on the vertical cross-talk amount and the horizontal cross-talk amount in case that the target pixel 800 belongs to the third pixel line 813 included in the pixel line cluster 810.

According to one or more embodiments, a gain 821 may be 1 in case that the input grayscale corresponding to the target pixel 800 is between zero and 17, and a gain 825 may be 1.25 in case that the input grayscale corresponding to the target pixel 800 is 102 or more and less than 153. However, it may be difficult for the processor 130 to perform high-quality cross-talk compensation on the target pixel 800 having the input grayscale other than the lower limit value (i.e., representative value included in the grayscale range) in case of acquiring the gain 820 on the basis of the cross-talk weight and the lower limit value for each plurality of grayscale sections included in the histogram information in this way.

To this end, the processor 130 may identify the grayscale section (e.g., seven grayscale sections), to which each grayscale value of the plurality of pixels belonging to the first pixel line cluster 810 belongs, in the grayscale correction data of the target pixel (800), and acquire the interpolated gain value on the basis of the gain value (e.g., 0.8) corresponding to one identified grayscale section (e.g., ranging from 17 to 34) and the gain value (e.g., 0.75) corresponding to a grayscale section (e.g., ranging from 34 to 51) adjacent to one identified grayscale section.

According to one or more embodiments, the processor 130 may acquire the interpolated gain value corresponding to the input grayscale of the target pixel 800, included in the identified grayscale section, on the basis of gain values 822 and 823 respectively corresponding to the identified grayscale section and the adjacent grayscale section. Here, the processor 130 may apply various interpolation methods including a linear interpolation method.

Referring to FIG. 8C, the processor 130 may acquire an interpolated gain value 830 corresponding to the plurality of pixel line clusters including the first pixel line cluster 810. The interpolated gain value 830 may be a value included in the grayscale correction data for a representative pixel line of the plurality of pixel lines belonging to each pixel line cluster.

In addition, the processor 130 may acquire the corrected grayscale value of the plurality of pixels included in the display 110 on the basis of the interpolated gain value 830. The processor 130 may acquire the corrected grayscale value of each of the plurality of pixels included in the representative pixel line belonging to the first pixel line cluster 810 on the basis of a first interpolated gain value 831, and apply the image signal to the plurality of pixels on the basis of the corrected grayscale value. Likewise, the processor 130 may acquire the corrected grayscale values respectively corresponding to the representative pixel lines on the basis of interpolated gain values 832 to 835 corresponding to the respective representative pixel lines of the other pixel line clusters, except for the first pixel line cluster 810.

The description describes only the cross-talk compensation for the representative pixel line of the plurality of pixel lines belonging to each pixel line cluster with reference to FIG. 8C, which is provided for convenience of explanation, and the processor 130 may perform the cross-talk compensation operation by the same method described as above for all the pixel lines other than the representative pixel line.

Figure 9:
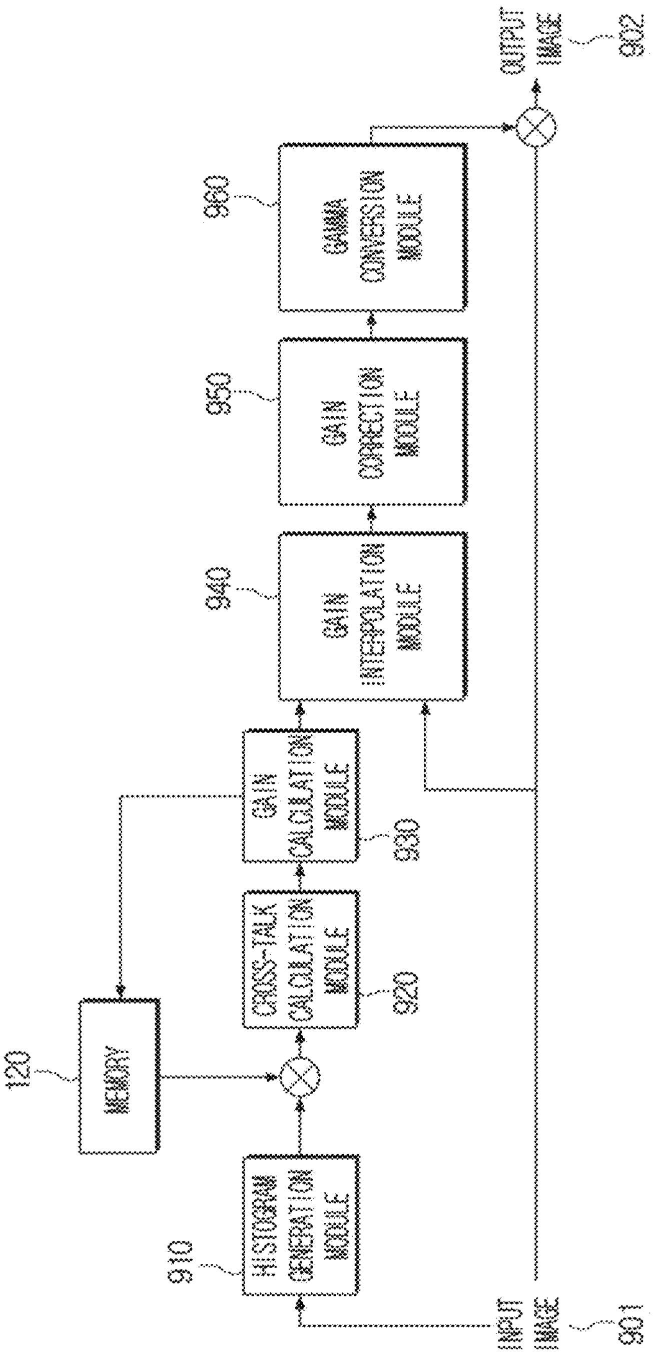
FIG. 9 is a diagram of the display device according to one or more embodiments.

FIG. 9 is a diagram of the display device according to one or more embodiments.

Referring to FIG. 9, the cross-talk compensation may be performed by a plurality of modules which are functional components of the display device 100. The operations performed by the plurality of modules may be performed by the processor 130 and the memory 120. However, to describe the function of the display device 100 step by step, for convenience, the description describes that the cross-talk compensation operation is performed by the plurality of modules with reference to FIG. 9.

The display device 100 may acquire an output image 902 by adjusting the R, G, and B grayscale values of an input image 901 to compensate for the cross-talk occurring in the display 110.

A histogram generation module 910 may acquire the grayscale value of the plurality of pixels included in the display 110 from the input image 901, and acquire the histogram information indicating the number of pixels included in another pixel line scanned simultaneously with the line to which each target pixel belongs for each grayscale section on the basis of the acquired the grayscale value. Here, the histogram generation module 910 may acquire the plurality of histogram information for each of the pixel line clusters simultaneously scanned on the display 110.

A cross-talk calculation module 920 may calculate the vertical cross-talk amount of the target pixel on the basis of the cross-talk weight and the acquired histogram information stored in the memory 120. The memory 120 may store the cross-talk weight based on the pixels included in another pixel line scanned simultaneously with the pixel line to which the target pixel belongs, and the cross-talk calculation module 920 may calculate the vertical cross-talk amount of the target pixel by cumulatively adding the cross-talk weight for each grayscale of the source pixel corresponding to the grayscale of the target pixel multiplied by the grayscale value of the source pixel, and the frequency for each grayscale of the source pixel in the histogram information. Here, the cross-talk calculation module 920 may calculate the vertical cross-talk amount of each of the pixel line clusters simultaneously scanned on the display 110.

A gain calculation module 930 may calculate the gain value for compensating for the vertical cross-talk on the basis of the calculate vertical cross-talk amount, the relationship between the output luminance and the input grayscale of the target pixel corresponding to the case where no cross-talk occurs, and the relationship between the output luminance and the input grayscale of the target pixel corresponding to the case where the cross-talk occurs. Its details are described with reference to FIG. 7, and thus omitted here. Here, the gain calculation module 930 may acquire the grayscale correction data including the gain value corresponding to the input grayscale of the target pixel for each of the pixel line clusters simultaneously scanned on the display 110, and store the acquired data in the memory 120.

A gain interpolation module 940 may interpolate the calculated gain value. The gain interpolation module 940 may identify the grayscale section, to which each grayscale value of the plurality of pixels displaying the input image 901 belongs, and acquire the interpolated gain value on the basis of the gain value corresponding to the identified grayscale section and the gain value corresponding to the grayscale section adjacent to the identified grayscale section. Its details are described with reference to FIG. 8C, and thus omitted here.

A gain correction module 950 may calculate the horizontal cross-talk amount of the target pixel, and correct the interpolated gain value on the basis of the calculated horizontal cross-talk amount. The gain correction module 950 may calculate the horizontal cross-talk amount of the target pixel on the basis of the cross-talk weight based on the pixels included in the pixel line to which the target pixel belongs, and the histogram information indicating the number of pixels included in the pixel line to which the target pixel belongs for each grayscale section. In addition, the gain correction module 950 may correct the interpolated gain value on the basis of the calculated horizontal cross-talk amount. As a result, the gain correction module 950 may acquire the gain value for compensating for not only the vertical cross-talk occurring in a pixel line cluster unit but also the horizontal cross-talk occurring in each pixel line belonging to the pixel line cluster.

A gamma conversion module 960 may perform the gamma conversion on the corrected gain value and adjust the R, G, and B grayscale values of the input image 901 on the basis of the gamma converted gain value. The output luminance may not be increased linearly even though the input grayscale of the target pixel is increased depending on a feature of the display 110 and a visual feature of the user. To this end, the gamma conversion module 960 may perform the gamma conversion on the corrected gain value, and acquire the corrected grayscale value by cumulatively adding the converted gain value multiplied by the R, G, or B grayscale of the input image 901. Due to the operation of the gamma conversion module 960, the display device 100 may display the output image 902 on the basis of the corrected grayscale value, and the output image 902 may have the vertical cross-talk and the horizontal cross-talk which are respectively reduced, thus increasing satisfaction of the user who receives this image.

Figure 10:
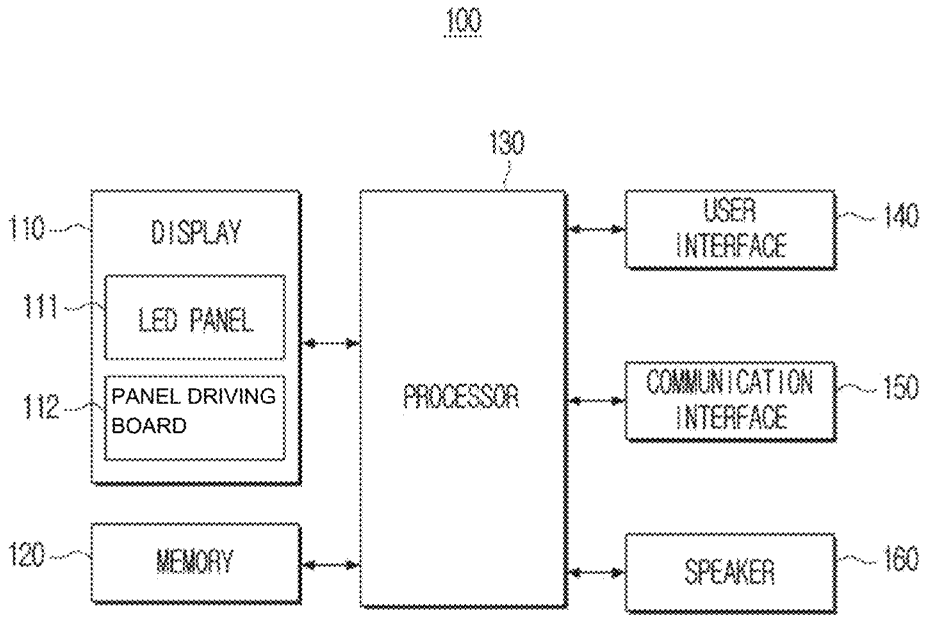
FIG. 10 is a block diagram of the display device according to one or more embodiments.

FIG. 10 is a block diagram of the display device according to one or more embodiments.

Referring to FIG. 10, the display device 100 may include an LED panel 111, a panel driving board 112, the memory 120, the processor 130, a user interface 140, a communication interface 150, and a speaker 160. The description omits a detailed description of components overlapping components shown in FIG. 2 among the components shown in FIG. 10.

The LED panel 111 may include the plurality of pixels, and each pixel may include the plurality of subpixels. In addition, the LED panel 111 may be configured by connecting and assembling a plurality of LED modules (i.e., LED module including at least one LED element). Here, each of the plurality of LED modules may include the plurality of pixels, such as, self-luminous pixels, arranged in a matrix form.

The LED panel 111 according to one or more embodiments may be implemented as a plurality of LED cabinets. In addition, the plurality of LED modules and/or the plurality of LED cabinets may include the plurality of LED pixels. The LED pixel may be implemented as RGB LEDs, and the RGB LEDs may include an R LED, a G LED, and a B LED together.

The panel driving board 112 may drive the LED panel 111 under the control of the processor 130. The panel driving board 112 may drive each LED the pixel by applying a driving voltage or flowing a driving current to drive each LED pixel included in the LED panel 111 under the control of the processor 130.

In case that the LED panel 111 includes the plurality of LED modules, the panel driving board 112 may include a plurality of panel driving modules respectively connected to the plurality of LED modules. The plurality of panel driving modules may drive the plurality of LED modules by supplying the driving current to the plurality of LED modules on the basis of respective control signals input by the processor 130.

Here, the panel driving board 112 may include a power supply for power supply. The power supply may be hardware supplying power to suit each system by converting an alternating current to a direct current for the current to be used stably in the LED panel 111. The power supply may largely include an input electromagnetic interference (EMI) filter device, an AC to DC rectifier device, a DC to DC switching converter device, an output filter, and an output device. The power supply may be implemented as a switched mode power supply (SMPS). The SMPS may be a direct current stabilization power supply that stabilizes the output by controlling an on-off time ratio of a semiconductor switch element, may have high efficiency, a smaller size, and a lower weight, and thus be used to drive the LED panel.

The user interface 140 may be a component allowing the display device 100 to interact with the user. The user interface 140 may include at least one of a touch sensor, a motion sensor, a button, a jog dial, a switch, or a microphone, and is not limited thereto.

The processor 130 may perform the cross-talk compensation on the basis of a user command in case of receiving the user command related to the cross-talk compensation operation through the user interface 140.

The communication interface 150 may input and output various types of data. The communication interface 150 may receive and transmit the various types of data with the external device (e.g., source device), an external storage medium (e.g., universal serial bus (USB) memory), or the external server (e.g., web hard) by using a communication method such as an access point (AP)-based wireless fidelity (Wi-Fi, i.e., wireless local area network (LAN)), a Bluetooth, a Zigbee, a wired/wireless LAN, a wide area network (WAN), Ethernet, an IEEE 1394, a high definition multimedia interface (HDMI), a USB, a mobile high-definition link (MHL), an Audio Engineering Society/European Broadcasting Union (AES/EBU) communication, an optical communication, or a coaxial communication.

According to one or more embodiments, the processor 130 may receive information related to the image, which is to be output through the display 110, through the communication interface 150. In addition, the processor 130 may control the communication interface 150 to transmit information related to the cross-talk compensation operation to a user terminal.

The speaker 160 may be a device converting an electroacoustic signal corresponding to audio generated by the processor 130 and provided by the display device 100 to a sound wave. The speaker 160 may include a permanent magnet, a coil, and a diaphragm, and may output the audio by vibrating a diaphragm by using electromagnetic interaction generated between the permanent magnet and the coil. The processor 130 may control the speaker 160 to output the audio related to the image provided through the display 110.

Figure 11:
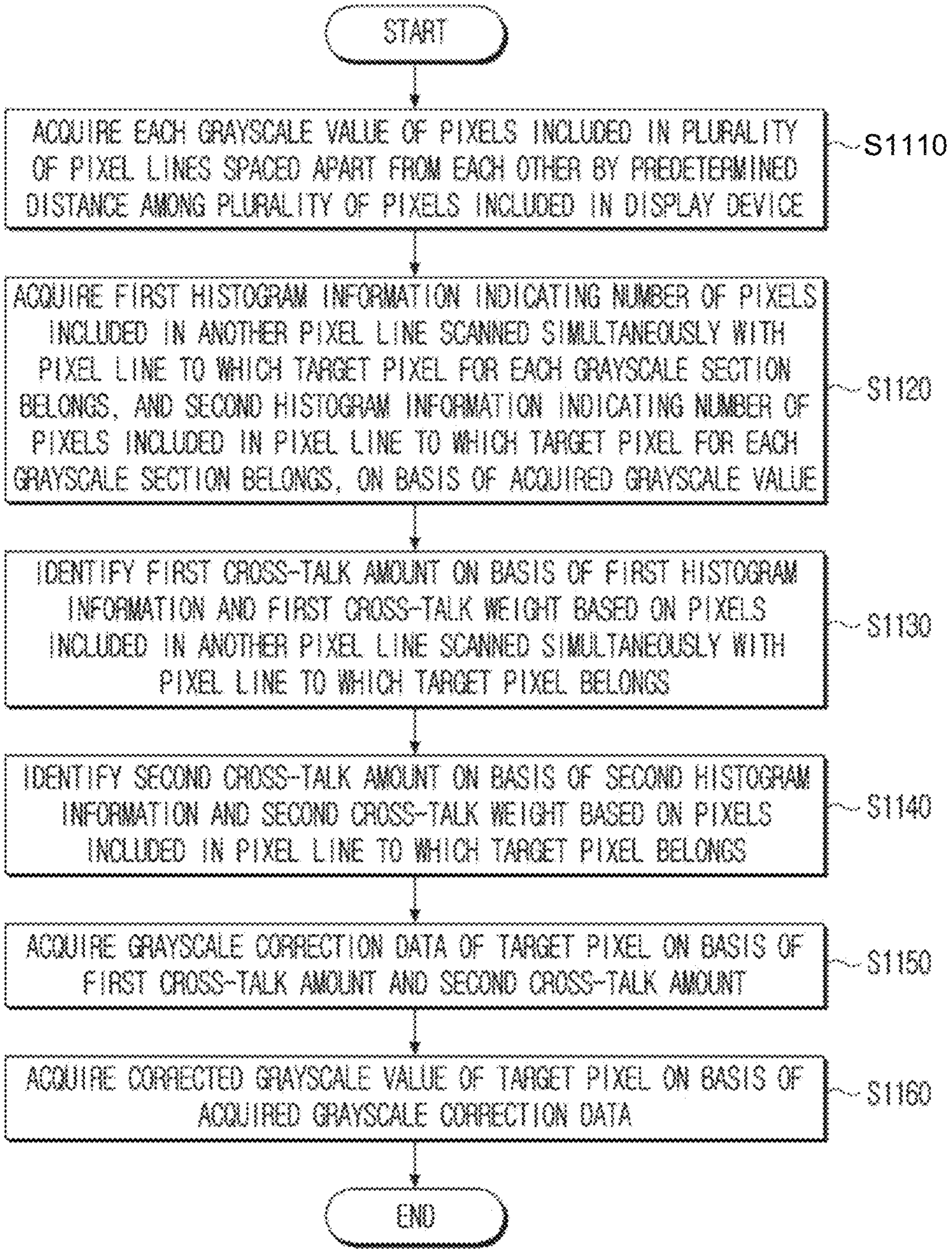
FIG. 11 is a flowchart of a control method according to one or more embodiments.

FIG. 11 is a flowchart of a control method according to one or more embodiments.

According to one or more embodiments, according the control method for a display device which simultaneously applies an image signal to a plurality of pixel lines spaced apart from each other by a predetermined distance, the display device may acquire each grayscale value of pixels included in the plurality of pixel lines spaced apart from each other by the predetermined distance among the plurality of pixels included in the display device (S1110).

Next, the display device may acquire first histogram information indicating the number of pixels included in another pixel line scanned simultaneously with the pixel line to which a target pixel for each grayscale section belongs, and second histogram information indicating the number of pixels included in the pixel line to which the target pixel for each grayscale section belongs, on the basis of the acquired grayscale value (S1120).

Next, the display device may identify a first cross-talk amount on the basis of the first histogram information and a first cross-talk weight based on the pixels included in another pixel line scanned simultaneously with the pixel line to which the target pixel belongs (S1130).

Next, the display device may identify a second cross-talk amount on the basis of the second histogram information and a second cross-talk weight based on the pixels included in the pixel line to which the target pixel belongs (S1140).

Next, the display device may acquire grayscale correction data of the target pixel on the basis of the first cross-talk amount and the second cross-talk amount (S1150).

Finally, the display device may acquire a corrected grayscale value of the target pixel on the basis of the acquired grayscale correction data (S1160).

Here, the first cross-talk weight and the second cross-talk weight may each include a cross-talk weight for each grayscale of a source pixel corresponding to a first grayscale value of the target pixel, and a cross-talk weight for each grayscale of a source pixel corresponding to a second grayscale value of the target pixel.

In addition, in the acquiring of the histogram information (S1120), the display device may acquire the first histogram information and the second histogram information by classifying an entire grayscale range as the plurality of grayscale sections, and identifying the number of pixels corresponding to each of the plurality of grayscale sections on the basis of the acquired grayscale value of each pixel.

Here, in the acquiring of the histogram information (S1120), the display device may acquire the first histogram information and the second histogram information by classifying a first grayscale range less than a critical value among the entire grayscale range as the plurality of grayscale sections of a first length, and classifying a second grayscale range of the critical value or more as the plurality of grayscale sections of a second length greater than the first length.

In addition, the grayscale correction data of the target pixel may include a gain value for adjusting the grayscale value for each of the plurality of grayscale sections, to which the target pixel belongs, and the acquiring of the corrected grayscale value of the target pixel (S1160) may include identifying, from the grayscale correction data of the target pixel, the grayscale section, to which the grayscale value of each pixel included in each of the plurality of pixel lines belongs, and acquiring the corrected grayscale value of the target pixel on the basis of an interpolated gain value acquired on the basis of a gain value corresponding to the identified grayscale section and the gain value corresponding to the grayscale section adjacent to the identified grayscale section.

In addition, the first cross-talk weight and the second cross-talk weight may each include the cross-talk weight for each grayscale of at least one of a red (R), green (G), or blue (B) subpixel of the source pixel corresponding to an R grayscale value of the target pixel, the cross-talk weight for each grayscale of at least one of the R, G, or B subpixel of the source pixel corresponding to a G grayscale value of the target pixel, and the cross-talk weight for each grayscale of at least one of the R, G, or B subpixel of the source pixel corresponding to a B grayscale value of the target pixel.

In addition, each of the plurality of pixels may include a light emitting diode (LED) pixel.

In addition, the acquiring of the corrected grayscale value (S1160) may further include performing gamma conversion on the acquired grayscale correction data, and acquiring the corrected grayscale value on the basis of the converted grayscale correction data.

According to the various embodiments of the present disclosure, the display device may reduce the cross-talk occurring on the display panel, thus increasing the satisfaction of the user who receives the image through the display panel.

Meanwhile, the methods according to the various embodiments of the present disclosure described above may be implemented in the form of an application which may be installed in a conventional display device.

In addition, the methods according to the various embodiments of the present disclosure described above may be implemented only by the software upgrade or hardware upgrade of the conventional display device.

In addition, the various embodiments of the present disclosure described above may be performed through an embedded server disposed in the display device, or at least one external server.

Meanwhile, the various embodiments of the present disclosure described above may be implemented in a computer or a computer-readable recording medium using software, hardware, or a combination of software and hardware. In some cases, the embodiments described in the present disclosure may be implemented by the processor 130 itself. According to software implementation, the embodiments such as the procedures and functions described in the present disclosure may be implemented by separate software modules. Each of the software modules may perform one or more functions and operations described in the present disclosure.

Meanwhile, a non-transitory computer-readable medium may store computer instructions for performing processing operations of the display device 100 according to the various embodiments of the present disclosure described above. The computer instructions stored in the non-transitory computer-readable medium may allow a specific device to perform the processing operations of the electronic apparatus 100 according to the various embodiments described above in case of being executed by a processor of the specific device.

The non-transitory computer-readable medium is not a medium that stores data for a while, such as a register, a cache, or a memory, but refers to a medium that semi-permanently stores data and is readable by the device. The non-transitory computer-readable medium may include a compact disk (CD), a digital versatile disk (DVD), a hard disk, a Blu-ray disk, a universal serial bus (USB), a memory card, a read-only memory (ROM), or the like.

While the disclosure has been illustrated and described with reference to one or more embodiments, it will be understood that the one or more embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiments described herein may be used in conjunction with any other embodiments described herein.

What is claimed is:

1. A display device comprising:

a display including a plurality of pixels in a plurality of pixel lines;

a memory for storing a first cross-talk weight based on a pixel included in another pixel line scanned simultaneously with a pixel line to which a target pixel belongs, and a second cross-talk weight based on a pixel included in the pixel line to which the target pixel belongs; and at least one processor configured to:

simultaneously apply an image signal to the plurality of pixel lines spaced apart from each other by a predetermined distance;

acquire a plurality of grayscale values and a plurality of grayscale sections of each of the plurality of pixels included in the plurality of pixel lines;

acquire, based on the plurality of grayscale values, first histogram information indicating a number of pixels included in the another pixel line scanned simultaneously with the pixel line to which the target pixel for each grayscale section belongs and second histogram information indicating a number of pixels included in the pixel line to which the target pixel for each grayscale section belongs;

identify a first cross-talk amount based on the first histogram information and the first cross-talk weight;

identify a second cross-talk amount based on the second histogram information and the second cross-talk weight;

acquire grayscale correction data of the target pixel based on the first cross-talk amount and the second cross-talk amount; and acquire a corrected grayscale value of the target pixel based on the grayscale correction data.

2. The display device according to claim 1, wherein the first cross-talk weight and the second cross-talk weight each include a cross-talk weight for each grayscale of a source pixel corresponding to a first grayscale value of the target pixel and a cross-talk weight for each grayscale of a source pixel corresponding to a second grayscale value of the target pixel.

3. The display device according to claim 1, wherein the at least one processor is further configured to acquire the first histogram information and the second histogram information by classifying an entire grayscale range into the plurality of grayscale sections and identifying the number of pixels corresponding to each of the plurality of grayscale sections based on each grayscale value of the acquired pixels.

4. The display device according to claim 3, wherein the at least one processor is further configured to acquire the first histogram information and the second histogram information by classifying a first grayscale range less than a critical value in the entire grayscale range as the plurality of grayscale sections of a first length and classifying a second grayscale range greater than the critical value as the plurality of grayscale sections of a second length greater than the first length.

5. The display device according to claim 1, wherein the grayscale correction data of the target pixel comprises a gain value for adjusting the grayscale value for each of the plurality of grayscale sections to which the target pixel belongs, and wherein the at least one processor is further configured to:

identify, from the grayscale correction data of the target pixel, the grayscale section to which each grayscale value of the plurality of pixels included in the plurality of pixel lines belongs; and acquire the corrected grayscale value of the target pixel based on an interpolated gain value based on the gain value corresponding to the identified grayscale section and the gain value corresponding to the grayscale section adjacent to the identified grayscale section.

6. The display device according to claim 1, wherein the first cross-talk weight and the second cross-talk weight each comprise:

a cross-talk weight for each grayscale of at least one of a red (R), green (G), or blue (B) subpixel of a source pixel corresponding to an R grayscale value of the target pixel;

a cross-talk weight for each grayscale of at least one of the R, G, or B subpixel of a source pixel corresponding to a G grayscale value of the target pixel; and a cross-talk weight for each grayscale of at least one of the R, G, or B subpixel of a source pixel corresponding to a B grayscale value of the target pixel.

7. The display device according to claim 1, wherein each of the plurality of pixels comprises a light emitting diode (LED) pixel.

8. The display device according to claim 1, wherein the at least one processor is further configured to perform gamma conversion on the grayscale correction data and acquire the corrected grayscale value based on the gamma converted grayscale correction data.

9. A method for controlling a display device for simultaneously applying an image signal to a plurality of pixels in a plurality of pixel lines spaced apart from each other by a predetermined distance, the method comprising:

acquiring a plurality of grayscale values and a plurality of grayscale sections of each of the plurality of pixels included in the plurality of pixel lines spaced apart from each other by the predetermined distance;

acquiring, based on the plurality of grayscale values, first histogram information indicating a number of pixels included in another pixel line scanned simultaneously with a pixel line to which a target pixel for each grayscale section belongs, and second histogram information indicating a number of pixels included in a pixel line to which the target pixel for each grayscale section belongs;

identifying a first cross-talk amount based on the first histogram information and a first cross-talk weight based on the plurality of pixels included in the another pixel line scanned simultaneously with the pixel line to which the target pixel belongs;

identifying a second cross-talk amount based on the second histogram information and a second cross-talk weight based on the plurality of pixels included in the pixel line to which the target pixel belongs;

acquiring grayscale correction data of the target pixel based on the first cross-talk amount and the second cross-talk amount; and acquiring a corrected grayscale value of the target pixel based on the grayscale correction data.

10. The method according to claim 9, wherein the first cross-talk weight and the second cross-talk weight each comprise a cross-talk weight for each grayscale of a source pixel corresponding to a first grayscale value of the target pixel and a cross-talk weight for each grayscale of a source pixel corresponding to a second grayscale value of the target pixel.

11. The method according to claim 9, wherein the first histogram information and the second histogram information are acquired by classifying an entire grayscale range into the plurality of grayscale sections and identifying the number of pixels corresponding to each of the plurality of grayscale sections based on each grayscale value of the acquired pixels.

12. The method according to claim 11, wherein the first histogram information and the second histogram information are further acquired by classifying a first grayscale range less than a critical value in the entire grayscale range as the plurality of grayscale sections of a first length and classifying a second grayscale range greater than the critical value as the plurality of grayscale sections of a second length greater than the first length.

13. The method according to claim 9, wherein the grayscale correction data of the target pixel comprises a gain value for adjusting the grayscale value for each of the plurality of grayscale sections to which the target pixel belongs, and wherein the acquiring of the corrected grayscale value of the target pixel comprises:

identifying, from the grayscale correction data of the target pixel, the grayscale section to which each grayscale value of the plurality of pixels included in the plurality of pixel lines belongs; and acquiring the corrected grayscale value of the target pixel based on an interpolated gain value based on the gain value corresponding to the identified grayscale section and the gain value corresponding to the grayscale section adjacent to the identified grayscale section.

14. The method according to claim 9, wherein the first cross-talk weight and the second cross-talk weight each comprise:

a cross-talk weight for each grayscale of at least one of a red (R), green (G), or blue (B) subpixel of a source pixel corresponding to an R grayscale value of the target pixel;

a cross-talk weight for each grayscale of at least one of the R, G, or B subpixel of a source pixel corresponding to a G grayscale value of the target pixel; and a cross-talk weight for each grayscale of at least one of the R, G, or B subpixel of a source pixel corresponding to a B grayscale value of the target pixel.

15. A non-transitory computer-readable recording medium storing a computer instruction that causes a display device to perform an operation executed by at least one processor of the display device, wherein the operation includes:

acquiring a plurality of grayscale values and a plurality of grayscale sections of each of a plurality of pixels included in a plurality of pixel lines spaced apart from each other by a predetermined distance;

acquiring, based on the plurality of grayscale values, first histogram information indicating a number of pixels included in another pixel line scanned simultaneously with a pixel line to which a target pixel for each grayscale section belongs and second histogram information indicating a number of pixels included in the pixel line to which the target pixel for each grayscale section belongs;

identifying a first cross-talk amount based on the first histogram information and a first cross-talk weight based on the plurality of pixels included in the another pixel line scanned simultaneously with the pixel line to which the target pixel belongs;

identifying a second cross-talk amount based on the second histogram information and a second cross-talk weight based on the plurality of pixels included in the pixel line to which the target pixel belongs;

acquiring grayscale correction data of the target pixel based on the first cross-talk amount and the second cross-talk amount; and acquiring a corrected grayscale value of the target pixel based on the grayscale correction data.

16. The non-transitory computer-readable medium of claim 15, wherein the first cross-talk weight and the second cross-talk weight each comprise a cross-talk weight for each grayscale of a source pixel corresponding to a first grayscale value of the target pixel and a cross-talk weight for each grayscale of a source pixel corresponding to a second grayscale value of the target pixel.

17. The non-transitory computer-readable medium of claim 15, wherein the first histogram information and the second histogram information are acquired by classifying an entire grayscale range into the plurality of grayscale sections and identifying the number of pixels corresponding to each of the plurality of grayscale sections based on each grayscale value of the acquired pixels.

18. The non-transitory computer-readable medium of claim 17, wherein the first histogram information and the second histogram information are further acquired by classifying a first grayscale range less than a critical value in the entire grayscale range as the plurality of grayscale sections of a first length and classifying a second grayscale range greater than the critical value as the plurality of grayscale sections of a second length greater than the first length.

19. The non-transitory computer-readable medium of claim 15, wherein the grayscale correction data of the target pixel comprises a gain value for adjusting the grayscale value for each of the plurality of grayscale sections to which the target pixel belongs, and wherein the acquiring of the corrected grayscale value of the target pixel comprises:

identifying, from the grayscale correction data of the target pixel, the grayscale section to which each grayscale value of the plurality of pixels included in the plurality of pixel lines belongs; and acquiring the corrected grayscale value of the target pixel based on an interpolated gain value based on the gain value corresponding to the identified grayscale section and the gain value corresponding to the grayscale section adjacent to the identified grayscale section.

20. The non-transitory computer-readable medium of claim 15, wherein the first cross-talk weight and the second cross-talk weight each comprise:

a cross-talk weight for each grayscale of at least one of a red (R), green (G), or blue (B) subpixel of a source pixel corresponding to an R grayscale value of the target pixel;

a cross-talk weight for each grayscale of at least one of the R, G, or B subpixel of a source pixel corresponding to a G grayscale value of the target pixel; and a cross-talk weight for each grayscale of at least one of the R, G, or B subpixel of a source pixel corresponding to a B grayscale value of the target pixel.

* * * * *